United States Patent [19]
Nagai

[11] Patent Number: 5,486,743
[45] Date of Patent: Jan. 23, 1996

[54] INVERTER AND AIR CONDITIONER CONTROLLED BY THE SAME

[75] Inventor: Kazunobu Nagai, Aichi, Japan

[73] Assignee: Kabushiki Kaisha Toshiba, Japan

[21] Appl. No.: 153,525

[22] Filed: Nov. 16, 1993

[30] Foreign Application Priority Data

Nov. 19, 1992 [JP] Japan .................................. 4-310007
Aug. 24, 1993 [JP] Japan .................................. 5-209191

[51] Int. Cl.$^6$ ..................................................... H02P 6/08
[52] U.S. Cl. .......................... 318/439; 318/254; 363/26; 363/134
[58] Field of Search .................................. 318/138, 254, 318/439; 363/16, 17, 24, 25, 26, 34, 37, 131, 132, 133, 134

[56] References Cited

U.S. PATENT DOCUMENTS

| | | | |
|---|---|---|---|
| 4,500,821 | 2/1985 | Bitting et al. | 318/254 |
| 5,075,608 | 12/1991 | Erdman et al. | 318/599 |

FOREIGN PATENT DOCUMENTS

| | | | |
|---|---|---|---|
| 0038694 | 10/1981 | European Pat. Off. | H02P 6/02 |
| 0424364A2 | 4/1991 | European Pat. Off. | A47L 9/28 |
| 59-36519 | 9/1984 | Japan | H02P 6/02 |
| 59-162793 | 9/1984 | Japan | H02P 6/02 |
| 62-123979 | 6/1987 | Japan | H02P 6/02 |
| 64-8890 | 1/1989 | Japan | H02P 6/02 |
| 5-10039 | 2/1993 | Japan | H02P 6/02 |
| 5-34919 | 5/1993 | Japan | H02P 6/02 |
| 5-34918 | 5/1993 | Japan | H02P 6/02 |
| 5-34917 | 5/1993 | Japan | H02P 6/02 |
| 5-34916 | 5/1993 | Japan | H02P 6/02 |
| 2126026 | 3/1984 | United Kingdom | H02P 6/00 |
| 2198263 | 6/1988 | United Kingdom | D06F 33/00 |
| 2230908 | 10/1990 | United Kingdom | H02P 6/02 |

*Primary Examiner*—Bentsu Ro
*Attorney, Agent, or Firm*—Limbach & Limbach

[57] ABSTRACT

An inverter controlling a brushless motor includes a microcomputer detecting a rotational position of a motor rotor on the basis of comparison signals obtained by comparison of terminal voltages of respective windings of the brushless motor with a reference voltage, determining a commutation timing. The current flowing through a DC power line is detected by a shunt resistor and the detected current is sampled and compared sequentially by the microcomputer. The microcomputer obtains a compensation time period in accordance with the result of comparison. The commutation timing of each of switching transistors of the inverter is compensated with respect to a reference commutation timing by the obtained compensation time period. Alternatively, the microcomputer detects energization time periods of diodes as the commutation time periods on the basis of the comparison signals and determine the commutation timing from the detected commutation time periods. The commutation timing is compensated by the compensation time period with respect to the reference commutation timing.

13 Claims, 28 Drawing Sheets

FIG. 2(a) P₁ 
FIG. 2(b) V_u 
FIG. 2(c) V_v 
FIG. 2(d) V_w 
FIG. 2(e) V_u' 
FIG. 2(f) V_v' 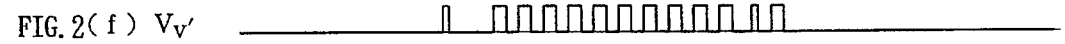
FIG. 2(g) V_w' 
FIG. 2(h) U_a 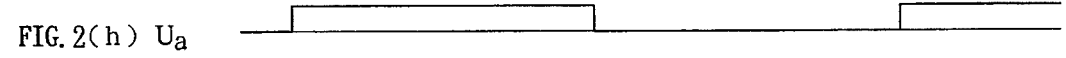
FIG. 2(i) V_a
FIG. 2(j) W_a 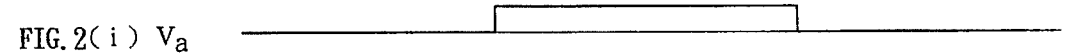
FIG. 2(k) { FIRST TIMING FUNCTION / SECOND TIMING FUNCTION / THIRD TIMING FUNCTION }
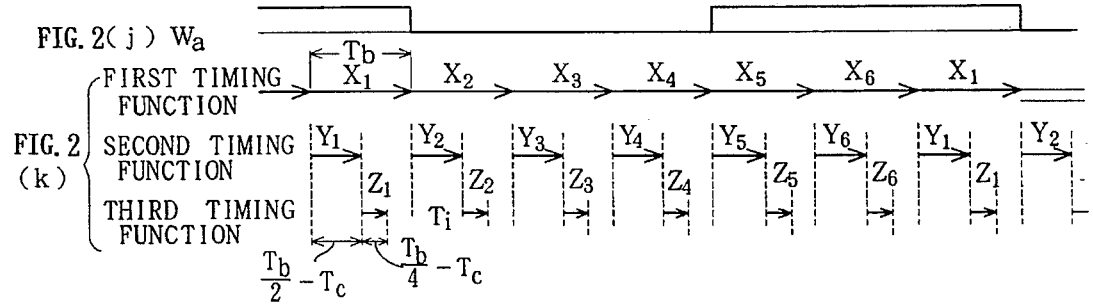
FIG. 2(l) U_p 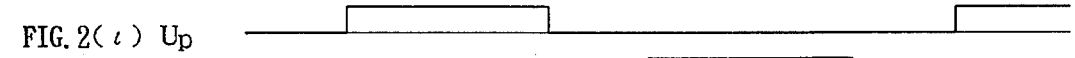
FIG. 2(m) U_n 
FIG. 2(n) V_p 
FIG. 2(o) V_n 
FIG. 2(p) W_p 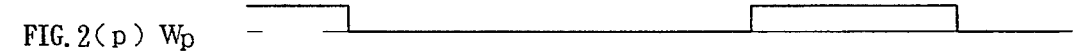
FIG. 2(q) W_n 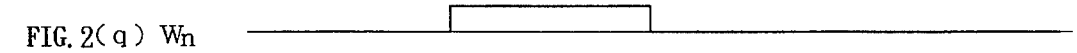

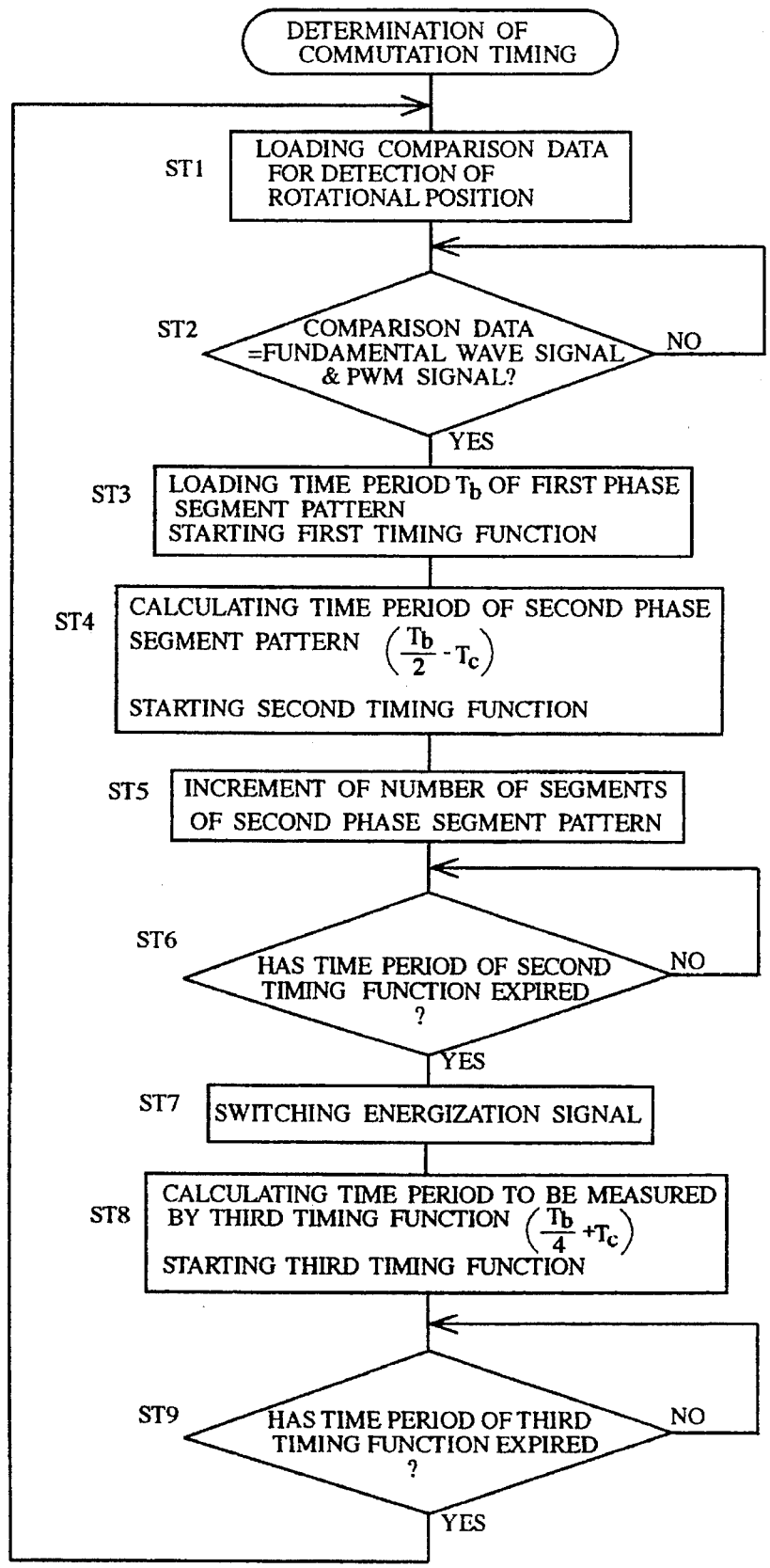
F I G. 5 (a)

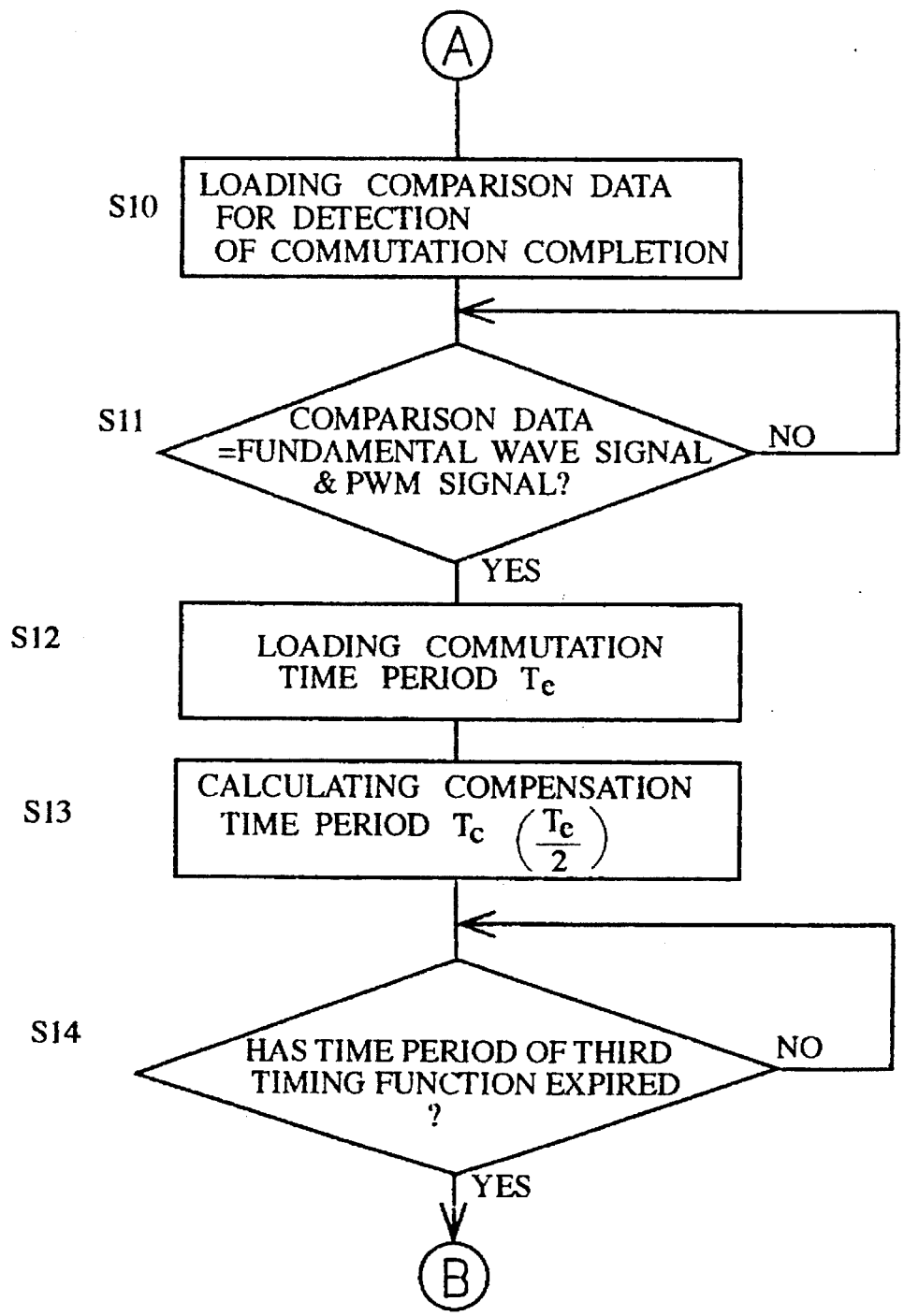
FIG. 9 (b) (Continued)

TERMINAL VOLTAGE $V_u$

WINDING CURRENT $I_u$

FUNDAMENTAL WAVE $V_u'$
SIGNAL

TERMINAL VOLTAGE $V_W$

INDUCED VOLTAGE
$V_0$

WINDING CURRENT $I_W$

FUNDAMENTAL WAVE $V_W'$ SIGNAL

FIG. 14 (a) $P_1$ 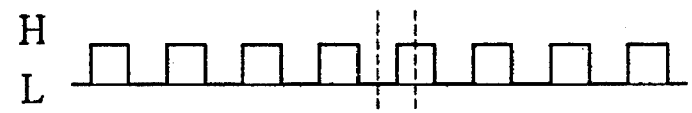
FIG. 14 (b) $V_u$ 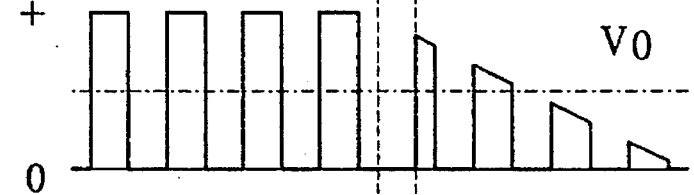
FIG. 14 (c) $V_u'$ 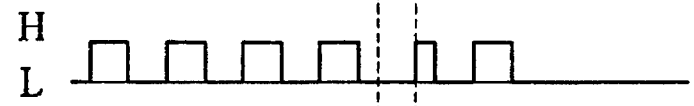
FIG. 14 (d) $P_1$ 
FIG. 14 (e) $V_u$ 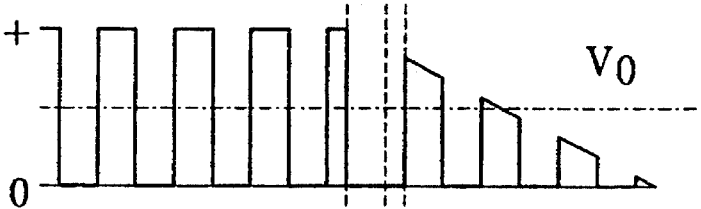
FIG. 14 (f) $V_u'$ 

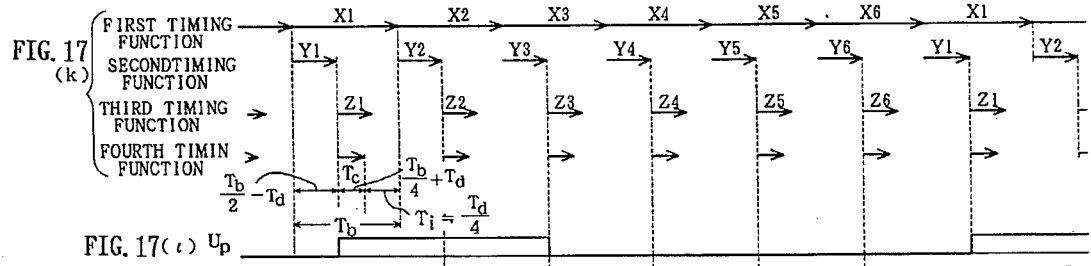

FIG.18 (a) $P_1$ 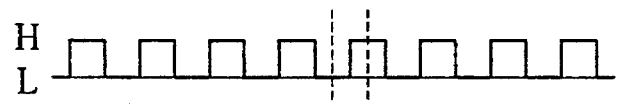
FIG.18 (b) $V_u$ 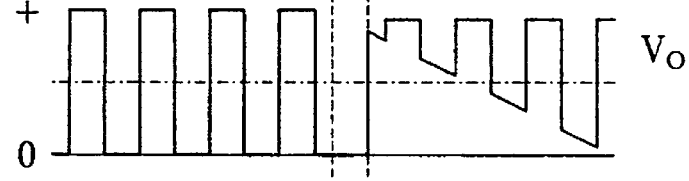 $V_o$
FIG.18 (c) $V_u'$ 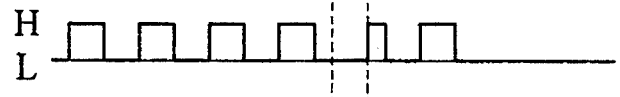
$t_s$ $t_e$
FIG.18 (d) $P_1$ 
FIG.18 (e) $V_u$ 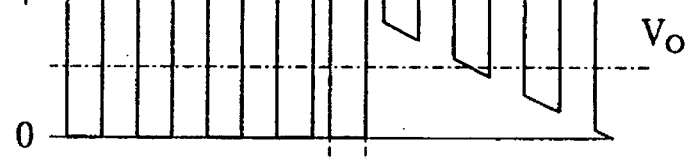 $V_o$
FIG.18 (f) $V_u'$ 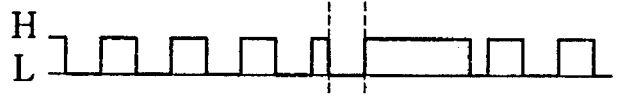
$t_s$ $t_e$ FIG. 23(a) (PRIOR ART) $P_1$ 

FIG. 23(b) (PRIOR ART) $V_u$ 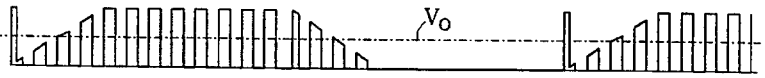

FIG. 23(c) (PRIOR ART) $V_v$ 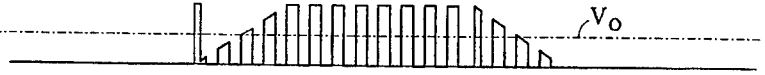

FIG. 23(d) (PRIOR ART) $V_w$ 

FIG. 23(e) (PRIOR ART) $V_u'$ 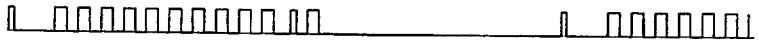

FIG. 23(f) (PRIOR ART) $V_v'$ 

FIG. 23(g) (PRIOR ART) $V_w'$ 

FIG. 23(h) (PRIOR ART) $U_a$ 

FIG. 23(i) (PRIOR ART) $V_a$ 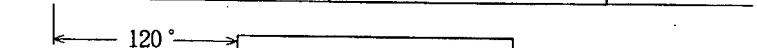

FIG. 23(j) (PRIOR ART) $W_a$ 

FIG. 23(k) (PRIOR ART) {FIRST TIMING FUNCTION / SECOND TIMING FUNCTION} 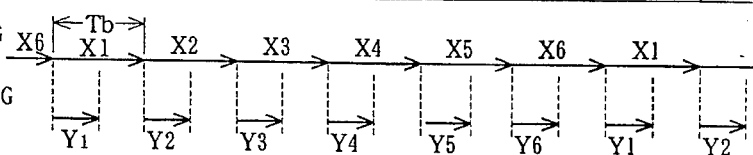

FIG. 23(l) (PRIOR ART) $U_p$ 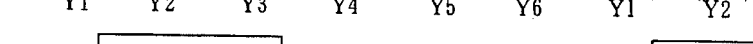

FIG. 23(m) (PRIOR ART) $U_n$ 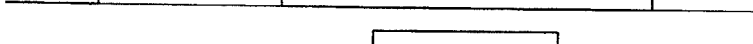

FIG. 23(n) (PRIOR ART) $V_p$ 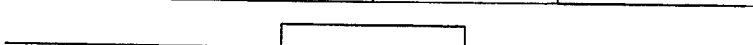

FIG. 23(o) (PRIOR ART) $V_n$ 

FIG. 23(p) (PRIOR ART) $W_p$ 

FIG. 23(q) (PRIOR ART) $W_n$ 

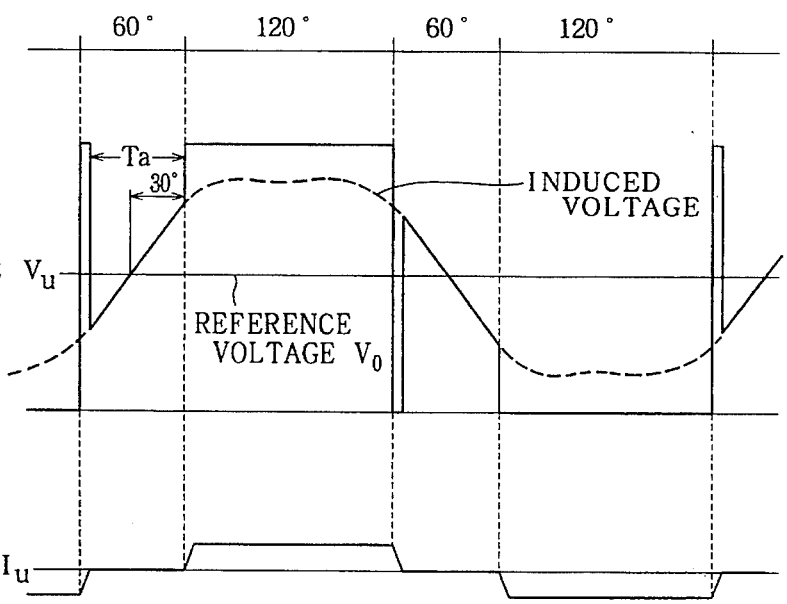

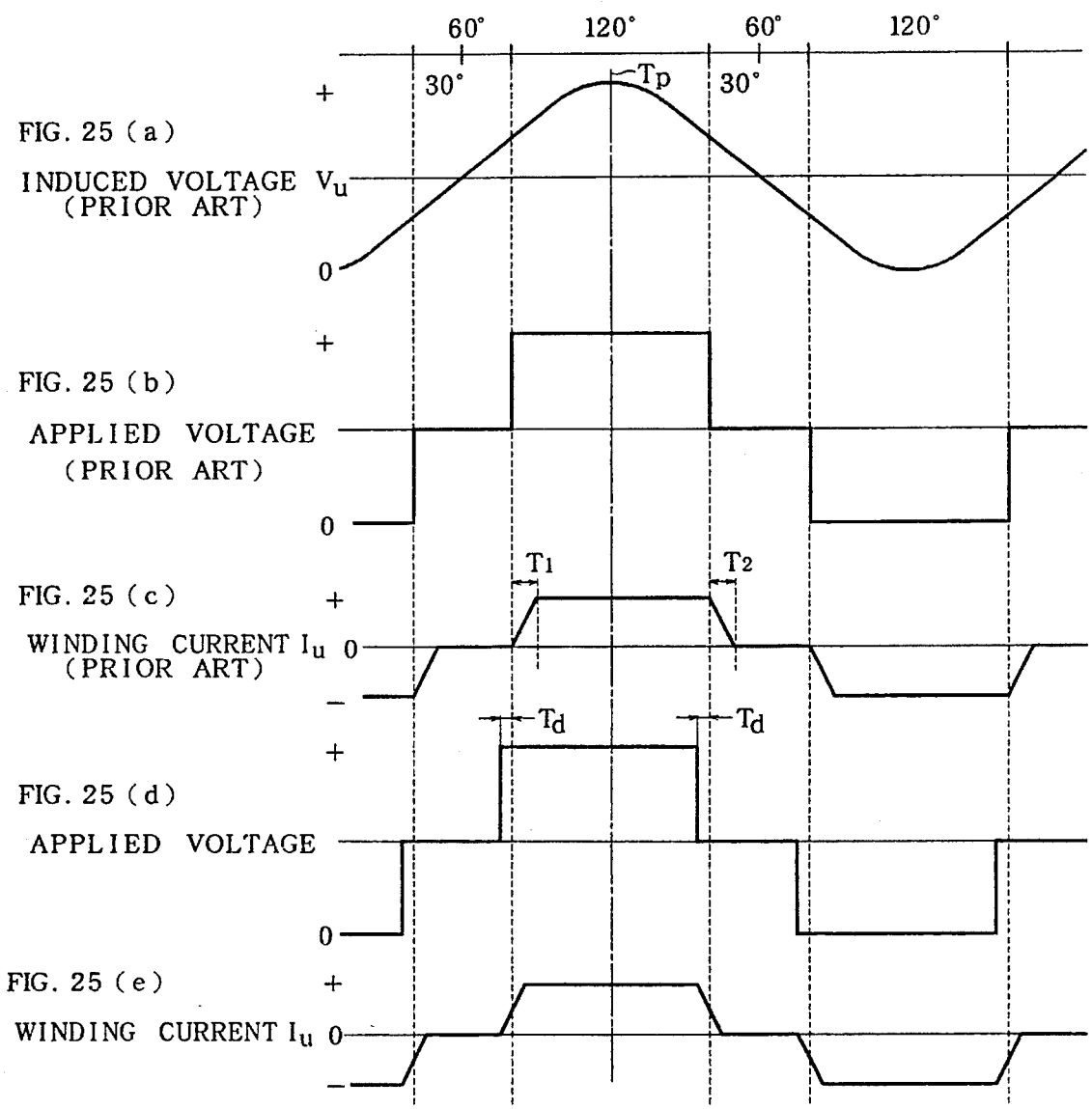

5,486,743

INVERTER AND AIR CONDITIONER CONTROLLED BY THE SAME

BACKGROUND OF THE INVENTION

1. Field of the Invention

This invention relates to an inverter including a switching circuit for sequentially energizing a plurality of windings of an electric motor such as a brushless motor at a time according to a commutation timing corresponding to a predetermined rotational position of a rotor of the motor and further relates to an air conditioner controlled by such an inverter as mentioned above.

2. Description of the Prior Art

Air conditioners and refrigerators have recently employed, as a compressor motor, a brushless motor classified into a DC motor and an inverter driving the brushless motor for the purpose of variable performance of a compressor or saving electric power consumption. The brushless motor usually necessitates one or more position sensors sensing a rotational position of a rotor of the motor and generating a rotational position signal so that a phase winding to be energized is determined. Since the compressor motor is exposed to the refrigerant in the air conditioners and the refrigerators, it is sometimes difficult to dispose the position sensors in the brushless motor employed in the compressor. In view of this drawback, the present inventor and others have developed a technique for detecting a voltage induced in the motor winding and for electrically processing the detected voltage into the rotational position signal. This technique was applied for patent in Japan and the application was published under Japanese unexamined patent application publication No. 64-8890 (1989).

The above-mentioned technique will be described as the prior art for the present invention with reference to FIGS. 22 to 24. In the following description, the pulse width modulation system is applied to the technique. Referring to FIG. 22 showing the electrical circuit of an inverter, a DC power supply circuit 2 connected to an AC power supply 1 comprises a full-wave rectifier circuit 3, a reactor 4a and a smoothing capacitor 4b. A three-phase bridge circuit 13 serving as a switching circuit is connected between a positive side DC power supply line 5 and a negative side DC power supply line 6 of the DC power supply circuit 2. The three-phase bridge circuit 13 comprises switching elements such as switching transistors 7 to 12. Output terminals 14u, 14v and 14w of the three-phase bridge circuit 13 are connected to terminals of windings 15u, 15v and 15w of a brushless motor 15 respectively. Three transistors 7, 9 and 11 are connected between the positive side DC power supply line 5 and the respective output terminals 14u, 14v and 14w to thereby serve as positive side switching elements. The other three transistors 8, 10 and 12 are connected between the negative side DC power supply line 6 and the respective output terminals 14u, 14v and 14w to thereby serve as negative side switching elements. When these transistors 7–12 are controlled to be turned on and off in a predetermined order, the windings 15u, 15v and 15w of the brushless motor 15 are repeatedly energized sequentially with a phase difference of 120 degrees (electrical angle), so that the brushless motor is driven. In this case, each transistor is turned on in the period of 120 degrees and off in the period of 240 degrees and furthermore, the duty ratio is controlled in each "on" period by a pulse width modulated (PWM) signal $P_1$ as shown in FIG. 23(a). Consequently, the terminal voltages $V_u$, $V_v$ and $V_w$ of the windings 15u, 15v and 15w of the brushless motor 15 have waveforms as shown in FIGS. 23(b), 23(c) and 23(d) respectively.

FIGS. 24(a) and 24(b) show waveforms of the terminal voltage $V_u$ and the winding current $I_u$ of the winding 15u of the brushless motor 15 respectively without the pulse width modulation applied. In the waveform of the terminal voltage $V_u$, a positive or negative slope section $t_a$ in the electrical angle of 60 degrees represents a voltage induced in the winding 15u and elongated positive and negative pulses represent pulse voltages due to diodes D1 to D6 connected in parallel to the respective transistors 7–12 of the three-phase bridge circuit 13. Reference symbol $V_0$ represents a reference voltage provided by a resistance type potential divider circuit 16 connected between the DC power supply lines 5, 6. The reference voltage $V_0$ is set at a half of a voltage in the DC power supply circuit 2 of the three-phase bridge circuit 13. As understood from FIGS. 24(a) and 24(b), a commutation timing lags by about 30 degrees with respect to a time when the induced voltage and the reference voltage $V_0$ cross, which time will be referred to as "zero crossing time."

The terminal voltages $Vu$, $V_v$ and $V_w$ are compared with the reference voltage $V_0$ by respective comparators 18 to 20 provided in a position signal circuit 17 serving as the position sensing means, thereby being converted to fundamental wave signals $V_u'$, $V_v'$ and $V_w'$ for discrimination of 180-degree sections of the terminal voltages $V_u$, $V_v$ and $V_w$ as shown in FIGS. 23(e), 23(f) and 23(g) respectively. These fundamental wave signals $V_u'$, $V_v'$ and $V_w'$ serve as information about the rotational position of the rotor of the brushless motor 15. The fundamental wave signals $V_u'$, $V_v'$ and $V_w'$ are then supplied to a waveform synthesizing circuit 21 serving as energization signal generating means. The fundamental wave signals $V_u'$, $V_v'$ and $V_w'$ are collated with the PWM signal $P_1$ by the waveform synthesizing circuit 21 to be converted to recognitive waveform signals $U_a$, $V_a$ and $W_a$ each comprising continuous square waves composed only of a positive pulse component and having a period of 180 degrees in electrical angle. The recognitive waveform signals $U_a$, $V_a$ and $W_a$ are out of phase with one another by 120 degrees. A rise point and a fall point of each recognitive waveform signal correspond to the abovementioned zero crossing point.

The waveform synthesizing circuit 21 is provided with first and second timing functions. Six first phase segment patterns X1 to X6 are formed from the three recognitive waveform signals $U_a$, $V_a$, $W_a$ by the first timing function. Each of the first phase segment patterns X1–X6 has a period of 60 degrees in electrical angle. Six second phase segment patterns Y1 to Y6 are formed by the second timing function. The second phase segment patterns have start points same as those of the first phase segment patterns X1–X6 respectively and each second phase segment pattern has a period of 30 degrees in electrical angle. The waveform synthesizing circuit 21 finally converts signals of the second phase segment patterns to energization signals $U_p$, $U_n$, $V_p$, $V_n$, $W_p$ and $W_n$ as shown in FIGS. 23(l) to 23(q) respectively.

The start points of the energization signals correspond to the end points of second phase segment patterns Y1–Y6 and accordingly, lag behind the zero crossing point by 30 degrees. Consequently, the phase patterns of the energization signals correspond to the commutation timing patterns required of the transistors 7–12 of the three-phase switching circuit 13.

On the other hand, a speed determination circuit 22 serving as speed detecting means determines a speed deviation on the basis of a speed command signal $S_c$ and the energization signal $W_n$ supplied thereto from the waveform synthesizing circuit 21 as a speed detection signal representative of the rotational speed of the brushless motor 15. The speed determination circuit 22 generates a speed deviation signal $S_d$ in accordance with the determined speed deviation, which signal is supplied to a pulse width modulation circuit 23. The pulse width modulation circuit 23 controls the duty ratio of the PWM signal $P_1$ in accordance with the magnitude of the speed deviation signal $S_d$. The PWM signal $P_1$ whose duty ratio has been controlled as described above is supplied to gates 25, 27 and 29 of a gate circuit 24 composing drive means. The PWM signal $P_1$ and the energization signals $U_p$, $V_p$ and $W_p$ are synthesized by the gates 25, 27, 29 or more specifically, the PWM signal is ANDed with the respective energization signals by the gates, for example, and resultant signals are supplied as base control signals to the bases of the positive side transistors 7, 9 and 11 of the three-phase bridge circuit 13 such that the transistors are on-off controlled in accordance with "on" and "off" modes of the PWM signal $P_1$. On the other hand, the energization signals $U_n$, $V_n$ and $W_n$ to which signals the pulse width modulation is not applied are supplied to the bases of the negative side transistors 8, 10 and 12 via gates 26, 28 and 30 respectively so that the transistors 8, 10 and 12 are on-off controlled. Consequently, the transistors 7–12 are on-off controlled by the energization signals $U_p$, $V_p$, $W_p$, $U_n$, $V_n$ and $W_n$ in the patterns as shown in FIGS. 23(l)–23(q), thereby driving the brushless motor 15. Furthermore, the speed of the brushless motor 15 is controlled by the control of the duty ratio by the PWM signal $P_1$ as shown in FIG. 23(a).

The above-mentioned "on" mode of the PWM signal $P_1$ refers either to the high or low level of the pulse signal at which level the transistors are turned on. The transistors are turned on when the pulse signal is at the high level in FIGS. 23(a)–23(q). The "off" mode of the PWM signal $P_1$ refers either to the high or low level of the pulse signal at which level the transistors are turned off. The transistors are turned off when the pulse signal is at the low level in FIGS. 23(a)–23(q).

As obvious from the foregoing, the windings 15u, 15v and 15w of each phase are energized for the period of 120 degrees with the lag of 30 degrees with respect to the zero crossing time. FIGS. 25(a), 25(b) and 25(c) show the relations among the induced voltage, applied voltage and current without the PWM control in the case of the winding 15u of phase U, for example. The voltage of the DC power supply circuit 2 applied to the winding 15u has a symmetrical waveform about the peak $P_t$ of the induced voltage in the period of 120 degrees. On the other hand, the current $I_u$ flowing into the winding 15u is gradually increased slopewise upon application of the voltage and reaches the normal state with the lag of time period $T_1$ relative to the applied voltage. The current $I_u$ is gradually decreased slopewise upon completion of application of the voltage, reaching zero with the lag of time period $T_2$ equal to the time period $T_1$. Accordingly, the current $I_u$ flowing into the winding 15u takes a waveform unsymmetrical about the peak $T_p$ of the induced voltage, resulting in a phase difference with respect to the induced voltage. This phase difference also occurs when the PWM control is applied.

A torque produced by an electric motor is generally shown by the product of the induced voltage and the current. Since the current lags the induced voltage in the prior art as described above, the efficiency of the motor is reduced. In the air conditioners, particularly, a quick cooling or warming operation is required at its maximum output under the limited power supply capacity. Thus, an improvement in the motor efficiency in the air conditioners or the like has been desired for the energy saving and reduction of the running cost.

In view of the foregoing, it has been proposed that the commutation timing be determined to take a time earlier by a predetermined electrical angle than the time lagging behind 30 degrees the time when the induced voltage and the reference voltage $V_0$ cross, as shown in FIG. 25(d). The predetermined electrical angle corresponds to a time period $T_d$ in FIG. 25(d). In this case, the waveform of the current $I_u$ is symmetrical about the peak $T_p$ of the induced voltage. Accordingly, since a power factor is improved, the current $I_u$ can be reduced and the motor efficiency can be improved.

However, the above-mentioned lag time periods $T_1$ and $T_2$ are not fixed but are varied. For example, the lag time periods become long as the load torque and that is, the current are larger while they are short as the motor speed and that is, the induced voltage are higher. Consequently, a sufficient improvement in the motor efficiency cannot be achieved even when the commutation timing is determined to take a time earlier by the predetermined electrical angle than the time lagging behind 30 degrees the time when the induced voltage and the reference voltage $V_0$ cross.

SUMMARY OF THE INVENTION

Therefore, an object of the present invention is to provide an inverter wherein even when the lag time of the winding current starting from initiation or completion of application of voltage to each motor winding is varied by the load torque and the rotational speed of the motor, the current can be caused to flow in each motor winding so as to be in phase with the induced voltage, whereby the efficiency of the motor can be improved.

Another object of the invention is to provide an air conditioner wherein a compressor motor is controlled by the above-described inverter so that the inverter can be operated efficiently.

In one aspect, the present invention provides an inverter comprising a switching circuit including a plurality of switching elements sequentially energizing windings of a plurality of phases of an electric motor, a pulse width modulation circuit for obtaining a pulse width modulated signal, electrical quantity detecting means for detecting a quantity of electricity supplied to the switching circuit, thereby generating an electrical quantity signal, position detecting means for detecting a rotational position of a rotor of the motor, thereby providing information about the rotational position of the rotor, energization signal generating means for generating an energization signal at a time according to a commutation timing necessary for the switching circuit on the basis of the information about the rotational position of the rotor, and drive means synthesizing the energization signal and the pulse width modulated signal for driving each switching element. The energization signal generating means comprises means for obtaining a reference commutation timing from the information about the rotational position of the rotor, electrical quantity comparing means for sequentially sampling the electrical quantity signals generated by the electrical quantity detecting means to thereby obtain a mean electrical quantity value and comparing the mean electrical quantity value with a last mean electrical quantity value, and compensation means for compensating the commutation timing so that the commutation timing corresponds to a point of time preceding the reference commutation timing by a predetermined compensation period of timed the compensation means changing the predetermined compensation time period in accordance with the result of comparison by the electrical quantity comparing means.

A quantity of electricity supplied to the switching circuit during rotation of the rotor, for example, the quantity of current is detected by the electrical quantity detecting means. The information about the rotational position of the rotor is obtained by the position detecting means. The reference commutation timing is obtained from the information about the rotational position of the rotor. The electrical quantity signals are sampled, and the mean electrical quantity value is obtained. The mean value is compared with the last mean electrical quantity value. The commutation timing is compensated so as to correspond to the point of time preceding the obtained reference commutation timing by the predetermined compensation period of time. The predetermined compensation time period is changed so as to take a value in accordance with the result of comparison of the mean electrical quantity value with the last mean value. The energization signal is generated at the time according to the compensated commutation timing. The drive means synthesizes the energization signal and the pulse width modulated signal and a resultant signal is supplied to each switching element of the switching circuit, thereby driving it. Thus, the plurality of motor windings are sequentially energized so that the rotor is rotated. Since the quantity of electricity supplied to the switching circuit is one of factors determining the commutation timing, it can be determined such that the winding current is in phase with the induced voltage of the winding even when the current is rendered small or even when the motor speed or the load torque are changed.

In another aspect, the invention provides an inverter comprising a switching circuit including a plurality of switching elements sequentially energizing windings of a plurality of phases of an electric motor, a pulse width modulation circuit for obtaining a pulse width modulated signal, position detecting means for detecting a rotational position of a rotor of the motor, thereby providing information about the rotational position of the rotor, speed detecting means for detecting a rotational speed of the rotor of the motor, means for determining a duty ratio of the pulse width modulated signal on the basis of a result of comparison of the detected rotational speed of the rotor with an externally supplied speed command, energization signal generating means for generating an energization signal at a time according to a commutation timing necessary for the switching circuit on the basis of the information about the rotational position of the rotor, and drive means synthesizing the energization signal and the pulse width modulated signal for driving each switching element. The energization signal generating means comprises means for obtaining a reference commutation timing from the information about the rotational position of the rotor and compensation means for compensating the commutation timing so that the commutation timing corresponds to a point of time preceding the reference commutation timing by a predetermined compensation period of time, the compensation means changing the predetermined compensation time period on the basis of the detected rotational speed of the rotor and the determined duty ratio of the pulse width modulated signal.

The information about the rotational position of the rotor being rotated is obtained by the position detecting means. The rotational speed of the rotor is detected by the speed detecting means. The pulse width modulation circuit compares the detected rotational speed of the rotor with the speed command, thereby obtaining the pulse width modulated signal whose duty ratio is in accordance with the result of the comparison. The energization signal generating means obtains the reference commutation timing from the information about the rotational position of the rotor. The energization signal generating means compensates the commutation timing so that the commutation timing corresponds to the point of time preceding the obtained reference commutation timing by the predetermined compensation period of time. The energization signal generating means changes the predetermined compensation time period on the basis of the detected rotational speed of the rotor and the determined duty ratio of the pulse width modulated signal. The energization signal is generated at the time according to the compensated commutation timing. The drive means synthesizes the energization signal and the pulse width modulated signal for driving the switching elements. Consequently, the windings of the plurality of phases of the motor are sequentially energized so that the rotor is rotated at a speed in accordance with the speed command. The factors determining the commutation timing include the rotational speed of the rotor and the duty ratio of the pulse width modulated signal, which duty ratio has a correlation with the load torque. Consequently, the commutation timing can be so determined that the voltage induced in each winding is in phase with each winging current even in variation of the rotational speed or load torque.

In further another aspect, the invention provides an inverter comprising a switching circuit including a plurality of switching elements sequentially energizing windings of a plurality of phases of an electric motor, the switching elements having respective diodes connected in parallel thereto, a pulse width modulation circuit for obtaining a pulse width modulated signal, commutation time period detecting means detecting an energization time period of each diode due to release of energy stored in each motor winding while the corresponding switching element is being commutated, the detected energization time period of each diode serving as a commutation time period of the corresponding switching element, energization signal generating means determining a commutation timing on the basis of the information about the rotational position of the rotor and the commutation time period of each switching element, thereby generating an energization signal corresponding to the determined commutation timing, and drive means synthesizing the energization signal and the pulse width modulated signal for driving each switching element.

The information about the rotational position of the rotor being rotated is obtained by the position detecting means. The commutation time period of each switching element is detected by the commutation time period detecting means. The energization signal generating means determines the commutation timing on the basis of the information about the rotational position of the rotor and the commutation time period of each switching element, thereby generating an energization signal corresponding to the determined commutation timing. The drive means synthesizes the energization signal and the pulse width modulated signal for driving the switching element. Consequently, the windings of the plurality of phases are sequentially energized so that the rotor is rotated.

The current flowing into the winding does not rise from zero to the normal state upon start of the voltage application and does not fall from the normal state to zero upon termination of the voltage application such that a time lag occurs. The reason for this is that the storage and release of the magnetic energy are not instantaneously performed under the influence of a counter electromotive force. Accordingly, the lag time period of the current at the time of start of the voltage application is approximately equal to that of the current at the time of termination of the voltage application. Furthermore, the commutation time period of each switching element is approximately equal to a time period necessary for release of the energy stored in the winding at the time of termination of voltage application and that is, the lag time period in the case where the winding current falls from the normal state to zero. The current flowing in this case reflows through the diode connected in parallel to the switching element. Thus, the commutation time period of the switching element can be determined by detecting the energization time period of the diode. Accordingly, the energization signal corresponding to the commutation timing is formed on the basis of not only the information about the rotational position of the rotor but also the commutation time period. Consequently, the winding current can be in the phase with the induced voltage.

In further another aspect, the invention provides an inverter comprising a switching circuit including a plurality of switching elements sequentially energizing windings of a plurality of phases of an electric motor, the switching elements having respective diodes connected in parallel thereto, a pulse width modulation circuit for obtaining a pulse width modulated signal, position detecting means for detecting a rotational position of a rotor of the motor, thereby providing information about the rotational position of the rotor, commutation time period detecting means comparing a terminal voltage of each motor winding with a reference voltage for detecting an energization time period of each diode due to release of energy stored in each motor winding while the corresponding switching element is being commutated, the commutation time period detecting means compensating the detected energization time period of each diode on the basis of a period and duty ratio of the pulse width modulated signal, thereby determining a commutation time period of each switching element, energization signal generating means determining a commutation timing on the basis of the information about the rotational position of the rotor and the commutation time period of each switching element, thereby generating an energization signal corresponding to the determined commutation timing, and drive means synthesizing the energization signal and the pulse width modulated signal for driving each switching element.

The above-described arrangement relates to a drawback resulting from the comparison of the terminal voltage of the winding with the reference voltage for the detection of the energization time period of the diode. In this case, the variation of the winding terminal voltage does not appear in synchronism with the termination of energization to the diode when the switching elements are on-off controlled in accordance with the "on" and "off" modes of the PWM signal. Consequently, the energization time period of the diode cannot be accurately detected by the comparison of the winding terminal voltage with the reference voltage. In the above-described arrangement, however, the energization time period of the diode obtained by the comparison of the winding terminal voltage with the reference voltage is compensated by the period and duty ratio of the PWM signal. The compensated energization time period of the diode can be rendered approximately equal to the actual energization time period.

In further another aspect, the invention provides an inverter comprising a switching circuit including a plurality of positive side switching elements each having a diode connected in parallel thereto between a positive direct current power supply line and each winding terminal of an electric motor and a plurality of negative side switching elements each having a diode connected in parallel thereto between a negative direct current power supply line and each motor winding terminal so that windings of a plurality of phases of the motor are sequentially energized, a pulse width modulation circuit for obtaining a pulse width modulated signal, position detecting means for detecting a rotational position of a rotor of the motor, thereby providing information about the rotational position of the rotor, commutation time period detecting means comparing a terminal voltage of each motor winding with a reference voltage to detect an energized state of each diode due to discharge of energy stored in each motor winding while the corresponding switching element is being commutated, thereby determining a commutation time period of each switching element on the basis of a time period of operation of detecting the energized state of each diode, energization signal generating means determining a commutation timing on the basis of the information about the rotational position of the rotor and the commutation time period of each switching element, thereby generating an energization signal corresponding to the determined commutation timing, selection signal generating means for generating a selection signal so that either the positive or the negative side switching elements are selected to be thereby controlled to be turned on and off by the pulse width modulated signal, the selection signal being changed for every commutation timing, and drive means for driving each switching element on the basis of the energization signal, the pulse width modulated signal and the selection signal so that the negative side switching elements are controlled in accordance with on and off states of the pulse width modulated signal when commutation is caused among the positive side switching elements and so that the positive side switching elements are controlled in accordance with the on and off states of the pulse width modulated signal when commutation is caused to occur between two of the negative side switching elements.

The switching elements to be on-off controlled by the PWM signal are switched between the positive side and negative side switching elements. Accordingly, even when the energization time period of the diode is detected by the comparison of the winding terminal voltage with the reference voltage, the variation of the winding terminal voltage appears in synchronism with termination of energization to the diode, which can provide accurate detection of the energization time period of the diode.

The energization signal generating means may obtain a reference commutation timing from the information about the rotational position of the rotor and determines the commutation timing so that the commutation timing corresponds to a time a compensation period of time before the reference commutation timing, the compensation period of time being set at a half of the commutation time period.

The determination of the commutation timing on the basis of the reference commutation timing may be determined by a software arrangement. More specifically, the position detecting means may supply the energization signal generating means with, as the information about the rotational position of the rotor, a time when a terminal voltage of the motor winding intersects a reference voltage set at a half of a direct current power supply voltage supplied to the switching circuit. The energization signal generating means may comprise a first timer timing a period between the time when the winding terminal voltage intersects the reference voltage and a subsequent time of intersection, operational means for operating a period of time between the time when the winding terminal voltage intersects the reference voltage and a reference commutation timing on the basis of the time period obtained by the first timer, thereby subtracting a compensation time period from the obtained time period to obtain a post-compensation time period, the compensation time period corresponding to a half of the commutation time period, and a second timer initiating a timing operation at the time when the winding terminal voltage intersects the reference voltage. The commutation timing is determined to be a time when the second timer has completed a timing operation for the post-commutation time period.

Other objects of the present invention will become obvious upon understanding of the illustrative embodiments about to be described. Various advantages not referred to herein will occur to those skilled in the art upon employment of the invention in practice.

BRIEF DESCRIPTION OF THE DRAWINGS

Several embodiments of the present invention will be described with reference to the accompanying drawings, in which:

FIGS. 2(a) to 2(q) are waveform charts showing waveforms of various signals and voltages shown in FIG. 1;

FIGS. 14(a) to 14(f) are exemplified charts of waveforms in the case where the positive side transistors are controlled to be turned on and off by the PWM signal;

FIGS. 17(a) to 17(r) are waveform charts showing waveforms of various signals and voltages shown in FIG. 16;

FIGS. 18(a) to 18(f) are waveform charts of the terminal voltage, current and fundamental wave signal at the time of commutation respectively;

FIGS. 23(a) to 23(q) are waveform charts showing waveforms of various signals and voltages shown in FIG. 22;

FIGS. 24(a) and 24(b) are waveform charts showing the terminal voltage and current of one of the windings of a brushless motor; and FIGS. 25(a) to 25(e) are waveform charts showing the induced voltage, applied voltage, current of one of the windings of the brushless motor, the applied voltage and the winding current, the latter two being in the case where the commutation timing is compensated to occur before the reference commutation timing.

DESCRIPTION OF THE PREFERRED EMBODIMENTS

Figure 1:
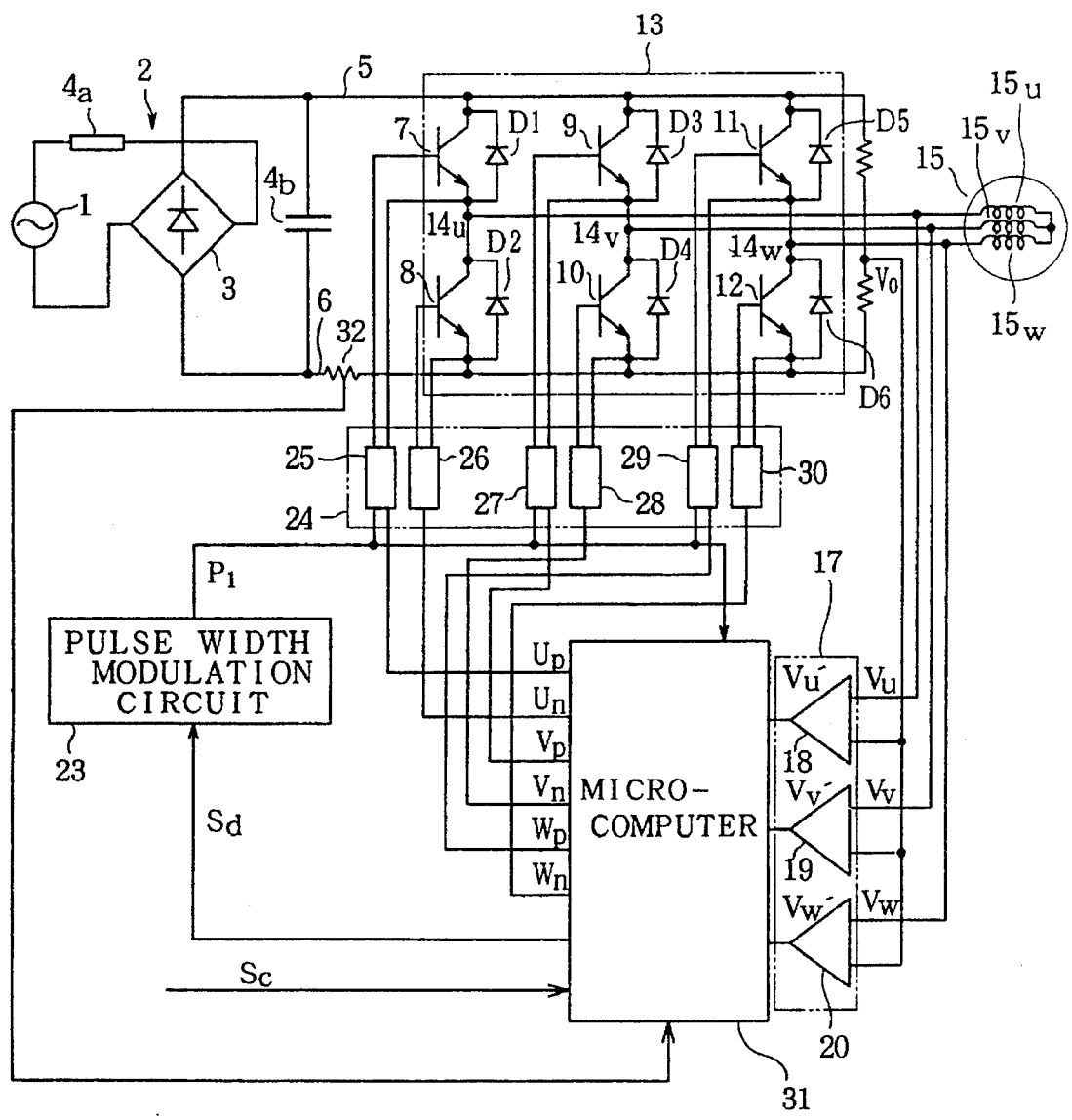
FIG. 1 is an electrical circuit diagram showing the inverter of a first embodiment in accordance with the present invention.

A first embodiment of the present invention will be described with reference to FIGS. 1 to 4. The following description relates only to the difference between the prior art arrangement described hereinbefore with reference to FIG. 22 and the arrangement of the first embodiment of the invention. The waveform synthesizing circuit 21 employed in the prior art inverter shown in FIG. 22 comprises a microcomputer 31. The microcomputer 31 has a function of changing the commutation timing and a third timing function for recognizing a specified period in the energization period as well as all the functions of the waveform synthesizing circuit 21.

In the recognition of the specified period, periods including the respective timings of rise and fall of each of the recognition waveform signals $U_a$, $V_a$ and $W_a$ are recognized. More specifically, the specified period refers to each period including the time when each of the terminal voltages $V_u$, $V_v$ and $V_w$ including the voltages induced at the windings 15u, 15v and 15w of the brushless motor 15 respectively and the reference voltage $V_0$ cross each other. For this purpose, the third timing function of the microcomputer 31 measures periods starting at the end points of the respective second phase segment patterns Y1 to Y6. Based on the measured periods Z1-Z6, the microcomputer 31 recognizes the specified period $T_i$ having the end point same as that (zero crossing time) of each of the first phase segment patterns X1-X6 and corresponding to the range of 15 degrees of electrical angle. The microcomputer 31 inputs the fundamental waveform signals $V_u'$, $V_v'$ and $V_w'$ from respective comparators 18 to 20 within the specified period $T_i$. Thus, limiting the input of the fundamental waveform signals to the specified period $T_i$ prevents false recognition that the time when the pulse voltage caused by each of the diodes D1–D6 and the reference voltage $V_0$ cross each other is the zero crossing time.

For the recognition of the zero crossing time by the microcomputer 31, the fundamental waveform signals $V_u'$, $V_v'$, $V_w'$ generated by the respective comparators 18–20 and the PWM signal $P_1$ are compared with comparison data for detection of the rotational position, which data is stored in a memory incorporated in the microcomputer 31. The comparison data has high (H) and low (L) modes of the fundamental waveform signals and the PWM signal $P_1$ for each first phase segment pattern X1–X6 as shown by the following TABLE 1:

TABLE 1

| First phase segment pattern | $V_u'$ | $V_v'$ | $V_w'$ | $P_1'$ |
|---|---|---|---|---|
| X1 | H | L | L | H |
| X2 | H | H | L | H |
| X3 | L | H | L | H |
| X4 | L | H | H | H |
| X5 | L | L | H | H |
| X6 | H | L | H | H |

The microcomputer 31 inputs the comparison data for each of the first phase segment patterns being in progress. When the states of each of the fundamental waveform signals $V_u'$, $V_v'$, $V_w'$ and the PWM signal $P_1$ correspond to the comparison data within the specified period $T_i$, the microcomputer 31 recognizes the zero crossing time, that is, the end point of the first phase segment pattern being in progress and the start point of the subsequent first phase segment pattern.

Figure 22:
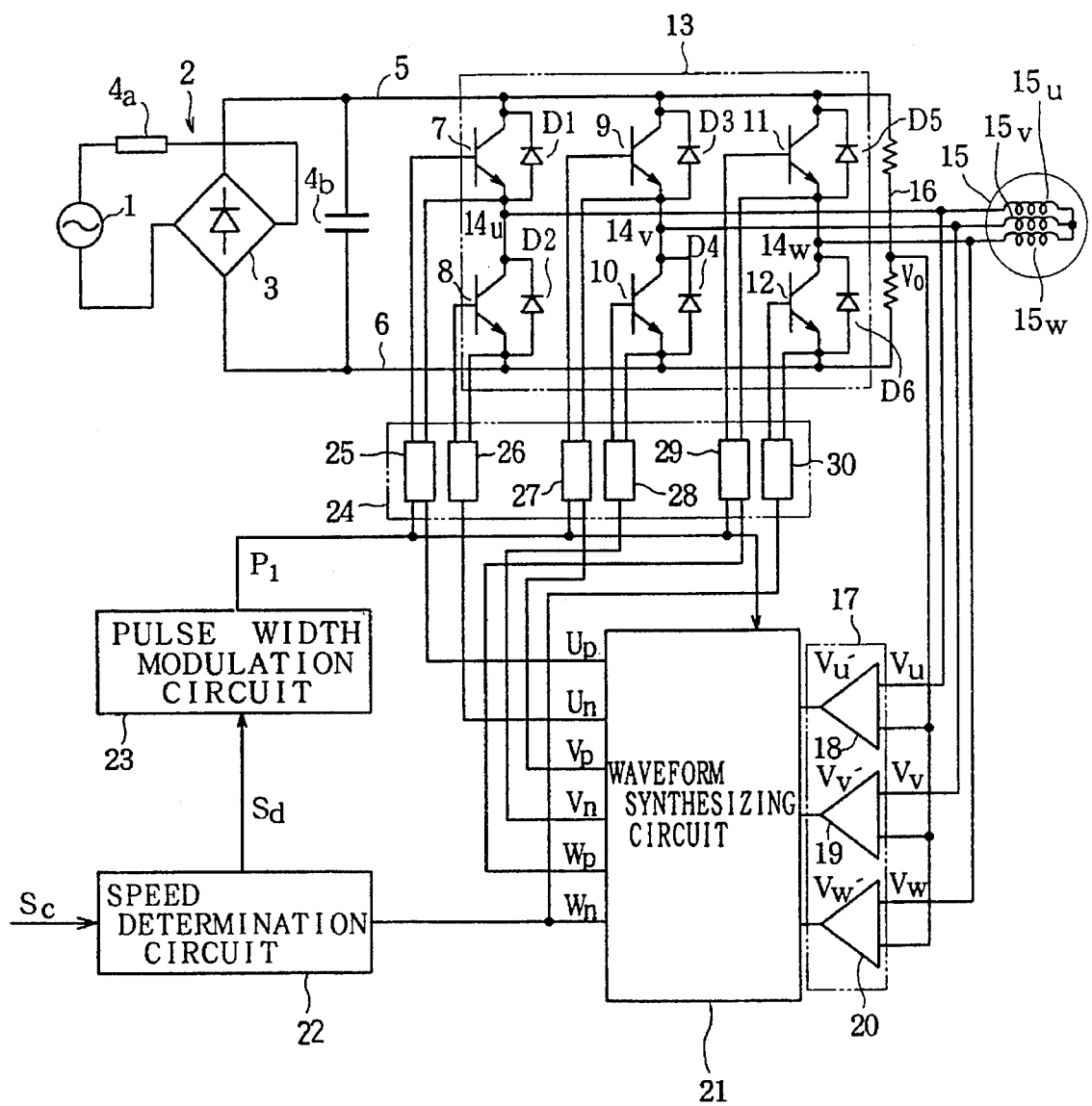
FIG. 22 is a circuit diagram showing a conventional inverter.

The speed determination circuit 22 in the prior art inverter shown in FIG. 22 is not employed in the inverter of the embodiment. The microcomputer 31 is assigned with a function of detecting the rotational speed of the rotor of the motor and a function of determining the duty ratio of the PWM signal $P_1$ in the embodiment, instead. More specifically, the microcomputer 31 determines the number of revolution or the rotational speed of the rotor per unit period on the basis of the sum of time periods of six patterns (a half turn in a four-pole motor) or twelve patterns (one turn in a four-pole motor) before one of the first phase segment patterns being in progress. The microcomputer 31 then compares the determined rotational speed with the command speed obtained from a speed command signal $S_c$ externally supplied thereto, thereby determining a speed deviation. The microcomputer 31 supplies the pulse width modulation circuit 23 with a duty ratio signal $S_d$ corresponding to the determined speed deviation. The pulse width modulation circuit 23 generates the PWM signal $P_1$ with a duty ratio $D_u$ represented by the duty ratio signal $S_d$.

In the embodiment, a quantity of electricity supplied to a three-phase bridge circuit 13 serving as a switching circuit or more specifically, a current is detected and the commutation timing is so determined that the detected current is rendered minimum. A shunt resistance 32 (current detecting element) serving as electrical quantity detecting means is connected to the negative side power supply line 6 for detecting the current flowing into the three-phase bridge circuit 13. The shunt resistance 32 delivers a detection voltage in accordance with the detected current. The detection voltage is supplied to the microcomputer 31. The microcomputer 31 is provided with an analog-to-digital (A/D) converter digitizing the detection voltage from the shunt resistance 32. The microcomputer 31 recognizes the digitized detection voltage as a current value.

The operation of the microcomputer 31 will now be described. In the embodiment, the microcomputer 31 determines the time lagging behind from the zero crossing time by a period corresponding to an electrical angle of 30 degrees to be a reference commutation timing. The microcomputer 31 sequentially samples the detection voltages from the shunt resistance 32 to compare each sampled voltage with the last sampled voltage. The microcomputer 31 sets a compensation time period $T_c$ on the basis of the result of the above-mentioned comparison of the sampled voltages and determines a time earlier by the compensation time period $T_c$ than the reference commutation timing to be a commutation timing.

The process of determination of the commutation timing will be described with reference to the flowcharts of FIGS. 3 and 4(a)–4(c). FIGS. 4(a)–4(c) show respective interruption routines interrupting the main routine shown in FIG. 3. FIG. 4(a) shows the routine for determining the duty ratio of the PWM signal for the speed control. This routine is executed once every one turn of the brushless motor 15, for example. Upon start of the routine, the microcomputer 31 inputs the speed command signal $S_c$ to obtain the command speed $N_c$ (step S1) and then, obtains an actual speed N of the brushless motor 15 (step S2). The microcomputer 31 then calculates the duty ratio $D_u$ from the following equation (1) to deliver the resulting duty ratio signal $S_d$ to the pulse width modulation circuit 23:

$$D_u=D_0-A\times(N-N_c) \tag{1}$$

where A is a gain constant.

FIG. 4(b) shows the routine for detecting the current flowing into the three-phase bridge circuit 13. The routine is executed in the intervals of 100 microseconds. Upon start of the routine, the microcomputer 31 inputs the digitized detection voltage from the shunt resistance 32 to obtain the current value corresponding to the detection voltage, thereby accumulating the current values (step Sa). At step Sb, the microcomputer 31 determines whether or not one second has elapsed from the time of start of accumulation of the current values. The microcomputer 31 returns to the main routine when it is determined that one second has not elapsed. When it is determined that one second has elapsed, the microcomputer 31 calculates an average current value from the accumulated current values and clears the accumulated value (step Sc), returning to the main routine.

FIG. 4(c) shows the routine for determining the compensation time period $T_c$ by comparison of the mean current values. The microcomputer 31 determines whether or not the speed of the brushless motor 15 is stable (step SA). Since the variation of the motor speed accompanies the change of the duty ratio, the microcomputer 31 monitors an amount of change of the duty ratio. The microcomputer 31 determines that the motor speed is stable when the amount of change of the duty ratio is at a predetermined value or below. When unstable, the motor speed varies with changes in the load torque, the voltage or the like. Since the duty ratio varies with variation of the motor speed, the current flowing into the three-phase bridge circuit 13 also varies. Accordingly, it is not proper to compare the average current values in the unstable state of the motor speed. The microcomputer 31 determines in the negative at step SA when the motor speed is unstable, returning to the main routine. When the motor speed is stable, the microcomputer 31 determines in the affirmative at step SA, advancing to step SB where the average current I obtained in the latest current detection at step Sc is compared with the average current I' obtained one second before the detection of the mean current I.

The microcomputer 31 returns to the main routine when I'=I at step SB. When I'<I, the microcomputer 31 advances to step SC where it is determined whether or not the compensation time period $T_c$ was increased in the last routine for determining the compensation time period. When the compensation time period was increased in the execution of the last main routine, the microcomputer 31 advances from step SB to step SF where the microcomputer 31 obtains a time period by subtracting a variation unit time period A from the last compensation time period $T_c$ and sets the compensation time period $T_c$ at the obtained time period, returning to the main routine. On the other hand, when the compensation time period $T_c$ was decreased in the last execution of the main routine and additionally, when I'=I, the microcomputer 31 advances from step SC to step SD where the microcomputer 31 obtains a time period by adding the variation unit time period to the last compensation time period $T_c$ and sets the compensation time period $T_c$ at the obtained time period, returning to the main routine.

The compensation time period $T_c$ is decreased when the last compensation time period was increased, and vice versa, as described above. Since the current flowing into the three-phase bridge circuit 13 has been increased or I'=I as the result of increase or decrease of the last compensation time period, the compensation time period $T_c$ is currently decreased for the decrease of the current when it was increased at the last time, while the compensation time period $T_c$ is currently increased when it was decreased at the last time.

On the other hand, when I'>I at step SB, the microcomputer 31 advances to step SE where it is determined whether or not the compensation time period $T_c$ is increased in the last routine for determining the compensation time period. When the compensation time period was increased in the execution of the last main routine for the purpose of increasing the current, the microcomputer 31 advances to step SD where it obtains a time period by adding the variation unit time period A to the last compensation time period $T_c$ and sets the current compensation time period at the obtained time period, returning to the main routine. On the other hand, when the compensation time period $T_c$ was decreased for the purpose of decreasing the current in the last execution of the main routine, the microcomputer 31 advances to step SF where it obtains a time period by adding the variation unit time period A to the last compensation time period $T_c$ and sets the current compensation time period at the obtained time period, returning to the main routine.

Assume now that the time is within the specified period $T_i$ of one of the first phase segment patterns X1–X6. The microcomputer 31 loads the comparison data (TABLE 1) for detection of the rotational position for the first phase segment pattern being in progress, at step ST1. The microcomputer 31 then compares, with the comparison data, the states of the fundamental wave signals $V_u'$, $V_v'$, $V_w'$ and the PWM signal $P_1$ input in the specified period, at step ST2. When the induced voltage and the reference voltage $V_0$ cross each other, the states of the fundamental wave signals $V_u'$, $V_v'$, $V_w'$ and the PWM signal $P_1$ correspond to those of the comparison data respectively. The microcomputer 31 determines in the affirmative at step ST2, and the subsequent one of the first phase segment patterns starts. Then, the microcomputer 31 loads data of a time period required for the first phase segment pattern terminated or a time period measured by the first timing function and restarts the first timing function for measurement of a time period of the subsequent first phase segment pattern started.

As obvious from the foregoing, the first timing function (first timer) repeatedly starts the timing operation upon start of each first phase segment pattern and repeatedly completes the timing operation upon termination of each first phase segment pattern or start of the subsequent first phase segment pattern. Accordingly, the first timing function measures the period between a zero crossing time and the subsequent zero crossing time, which period corresponds to an electrical angle of 60 degrees. At step ST4, the microcomputer 31 calculates the periods of second phase segment patterns Y1 to Y6 to be calculated by second timing function. When the period of each second phase segment pattern is represented as $(T_b/2)$, the commutation timing lags behind the zero crossing time by 30 degrees as in the prior art. In the embodiment, however, the period of each second phase segment pattern is compensated by the expression, $(T_b/2 - T_c)$ including the compensation time period $T_c$ set in the routine for determination of the compensation time period. Then, the second timing function (second timer) is started. Consequently, the commutation timing is compensated so as to be a time earlier by the time period $T_c$ than the time lagging behind the zero crossing time by 30 degrees.

The microcomputer 31 then increments the first phase segment patterns whose data is stored in a memory (not shown), at step ST5 and sets the first phase segment pattern started. When the second timing function completes the timing operation regarding $[(T_b/2) - T_c]$ at step ST6, the time of the completion corresponds to a commutation timing, and the energization signal is switched at step ST7.

Thereafter, the microcomputer 31 calculates time periods of respective third phase segment patterns Z1 to Z6 to be measured by third timing function, at step ST8. The time period of each second phase segment pattern leads the time period, $(T_b/4)$, by the compensation time period $T_c$. If the time period measured by the third timing function were set at one fourth of the time period of each first phase segment pattern, the specified period $T_i$ would start at the time earlier by the compensation time period $T_c$. In the embodiment, however, the time period measured by the third timing function is obtained from the expression, $[(T/4) + T_c]$, so that the specified period $T_i$ starts at a time earlier than the zero crossing time by a time period corresponding to an electrical angle of approximately 15 degrees. When determining at step ST9 that the timing operation of the third timing function has been completed and the time is within the specified period $T_i$, the microcomputer 31 returns to step ST1 for loading the comparison data for detection of the rotational position for the first phase segment pattern being in progress and incremented at step ST5.

According to the above-described embodiment, the commutation timing is caused to occur earlier by the compensation time period $T_c$ than that of the prior art inverter described above. As understood from the compensation time period determining routine shown in FIG. 4(c), the compensation time period $T_c$ is so determined that the current flowing into the three-phase bridge circuit 13 is rendered minimum. Consequently, the efficiency of the brushless motor 15 can be improved and accordingly, the power factor can be improved. The improvement in the power factor means that the waveforms of the currents flowing in the windings 15u, 15v, 15w are in phase with the voltages induced at the windings respectively. Furthermore, in the above-described manner of determining the compensation time period $T_c$, the commutation timing can be so determined that the waveform of the current is in phase with the induced voltage regardless of the variations in the load torque and the motor speed command.

The information about the rotational position of the rotor is obtained by comparison of each of the terminal voltages $V_u$, $V_v$ and $V_w$ with the reference voltage $V_0$. This arrangement eliminates provision of the position sensor employed in the conventional brushless motors. Furthermore, the reference voltage is set at a half of the voltage of the DC power supply circuit 2 of the three-phase bridge circuit 13. Accordingly, the reference voltage need not be set so as to have high and low potential values. The reason for this is that the time when each of the terminal voltages $V_u$, $V_v$, $V_w$ and the reference voltage cross each other is not fixed in relation with the reference commutation timing where the reference voltage is set at a value other than a half of the voltage of the DC power supply circuit 2. This causes the determination of the commutation timing to be difficult. To avoid this drawback, the reference voltage needs to be set to have high and low potential values so that the crossing time of each terminal voltage and the reference voltage is fixed in relation with the reference commutation timing.

The period between the zero crossing times is measured by the first timing function. The time period between the zero crossing time and a reference commutation timing is calculated on the basis of the measured period between the zero crossing times. A post-compensation time period starting from the zero crossing time is measured by the second timing function. Consequently, the commutation timing varying from case to case can be determined readily by the computer program.

Although the current flowing in the positive side DC power supply line 6 is detected as the current supplied to the three-phase bridge circuit 13 in the foregoing embodiment, a current flowing into the full-wave rectifier 3 of the DC power supply circuit 2 from the AC power supply 1 may be detected, instead. Furthermore, the current representative of the quantity of electricity supplied to the three-phase bridge circuit 13 is detected and the compensation time period $T_c$ is determined on the basis of the detected current in the foregoing embodiment. However, both current and voltage may be detected and the compensation time period $T_c$ may be determined on the basis of the detected current and voltage.

Figure 5:
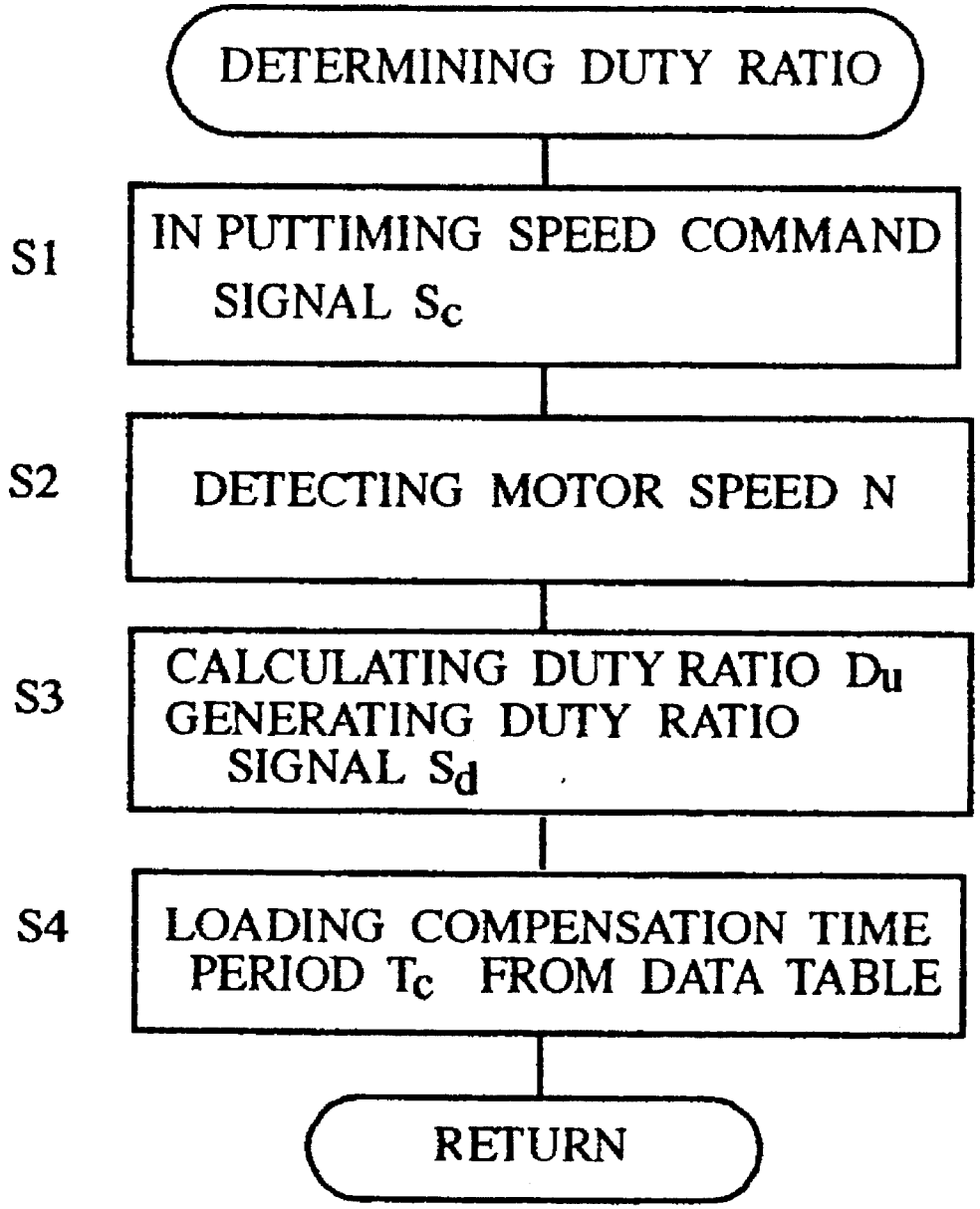
FIGS. 5(a) and 5(b) are flowcharts showing an operation of the microcomputer employed in the inverter of a second embodiment.
Figure 6:
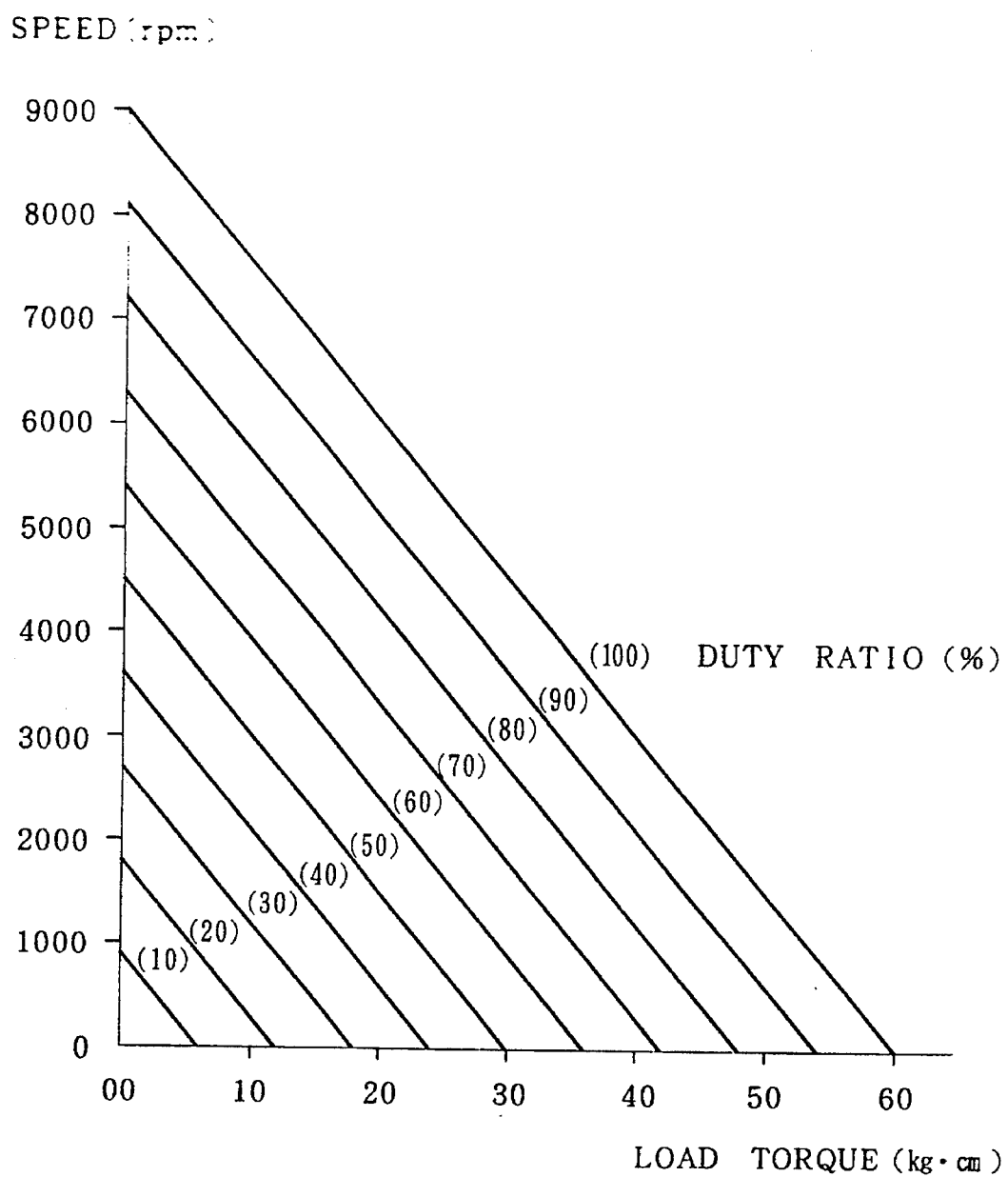
FIG. 6 is a graph showing speed-load torque characteristics of the motor.

FIGS. 5(a), 5(b) and 6 show a second embodiment of the invention. The shunt resistance 32 employed in the first embodiment is eliminated in the second embodiment. In the second embodiment, the reference commutation timing is determined to be the time lagging behind from the zero crossing time by the period corresponding to an electrical angle of 30 degrees, as in the first embodiment. The second embodiment differs from the first embodiment in that the commutation timing is varied by compensating the reference commutation timing with the compensation time period in accordance with the rotational speed and the load torque of the brushless motor 15. The microcomputer 31 is incorporated with a memory storing tabular data of the compensation time periods $T_c$ related to the rotational speed and the load torque of the brushless motor 15. These compensation time periods have been obtained by subdividing actual ranges of use by experiments or simulation.

The microcomputer 31 loads, from the tabular data, the data of the compensation time period $T_c$ in accordance with the rotational speed and the load torque of the brushless motor 15 for the purpose of varying the commutation timing for each first phase segment pattern. Since the load torque is not directly detected, it is obtained in the following manner in the embodiment. FIG. 6 shows the relationship between the rotational speed and the load torque with the duty ratio of the PWM signal $P_1$ as a parameter. The relationship among the rotational speed N, the duty ratio $D_u$ and the load torque $T_q$ is shown by the following expression (2):

$$N=(9000\times D_u(\%)/100)-(9000/60)\times T_q. \tag{2}$$

Accordingly, the load torque $T_q$ can be obtained from the following expression (3):

$$T_q=(90\times D_u(\%)-N)/150. \tag{3}$$

Based on the motor speed N obtained in the same manner as in the first embodiment and the load torque $T_q$ obtained by the expression (3), the microcomputer 15 loads the data of the compensation time period $T_c$ from the tabular data.

The following describes the functions of the microcomputer 31 with reference to the flowcharts of FIGS. 5(a) and 5(b). The routine shown in FIG. 5(b) is caused to interrupt the main routine shown in FIG. 5(a).

Referring first to FIG. 5(b) showing the interruption routine, the microcomputer 31 inputs the speed command signal $S_c$ to obtain the command speed $N_c$ (step S1). The microcomputer 31 then obtains the actual speed N (step S2) and calculates the duty ratio $D_u$ from the following equation (4):

$$D_u=D_0-A\times(N-N_c) \tag{4}$$

where A is a gain constant. The obtained duty ratio signal $S_d$ is delivered to the pulse width modulation circuit 23 (step S3). Then, the microcomputer 31 calculates the load torque from the equation (4) on the basis of the speed N obtained at step S2 and the duty ratio $D_u$. Based on the speed N and the load torque, the microcomputer 31 loads the compensation time period $T_c$ from the tabular data.

Figure 3:
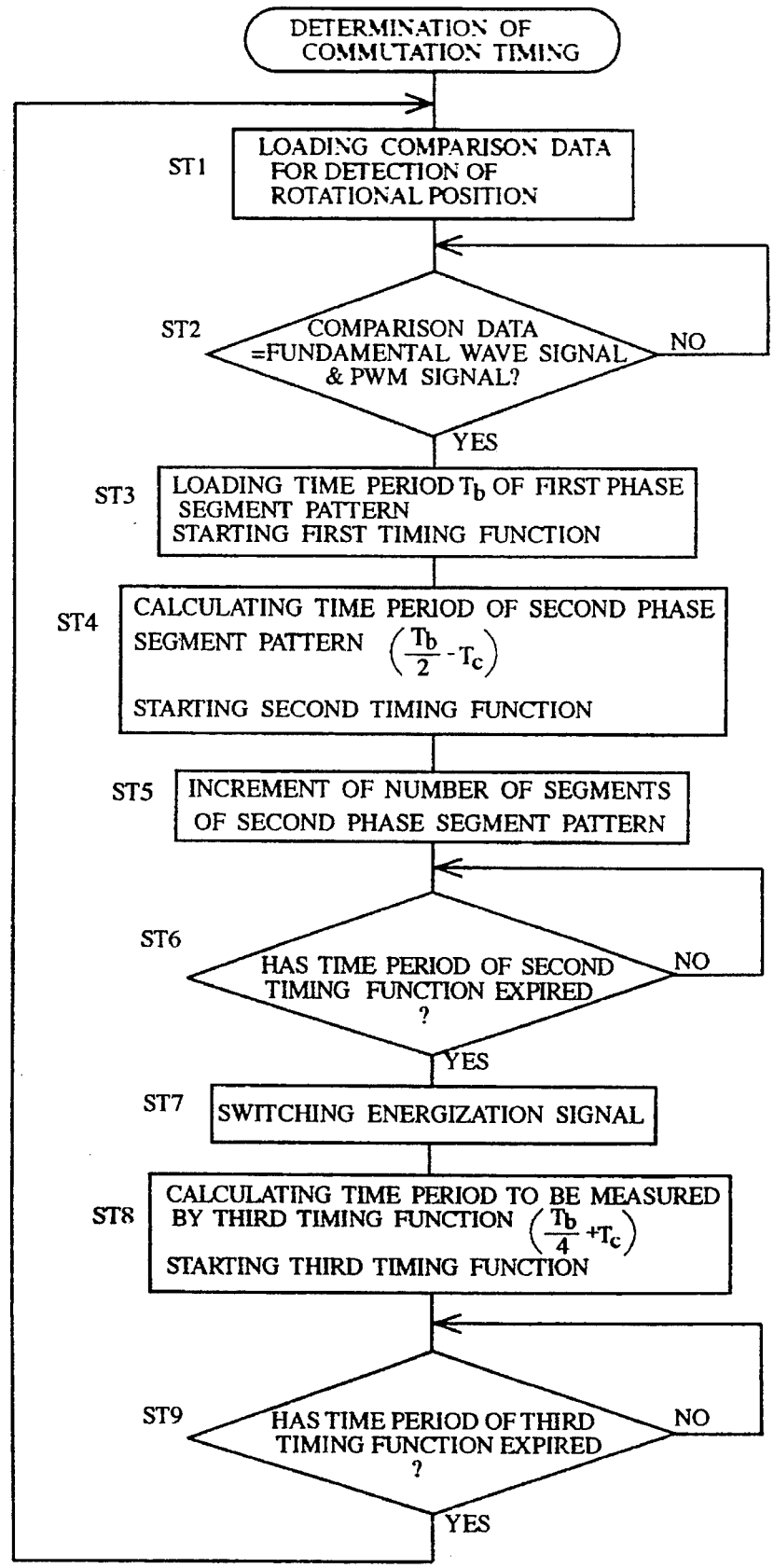
FIG. 3 is a flowchart showing an operation of a microcomputer incorporated in the inverter.
Figure 4:
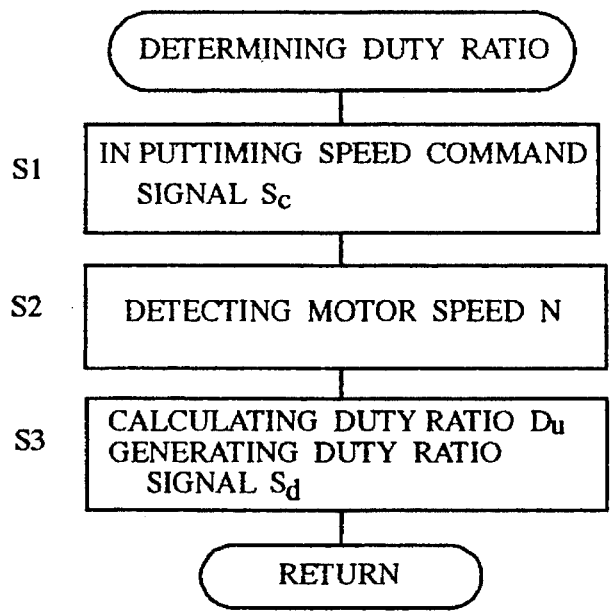
FIGS. 4(a) to 4(c) are also flowcharts showing an operation of the microcomputer.
Figure 4:
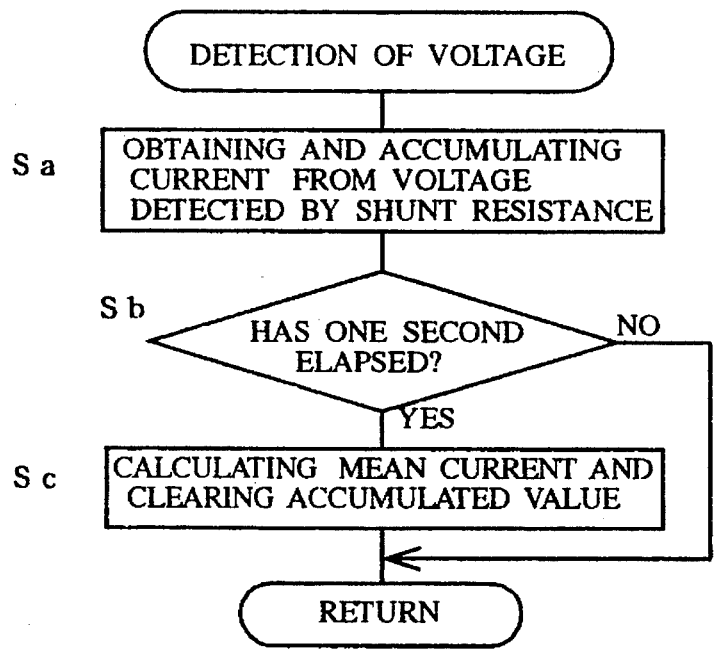
Figure 4:
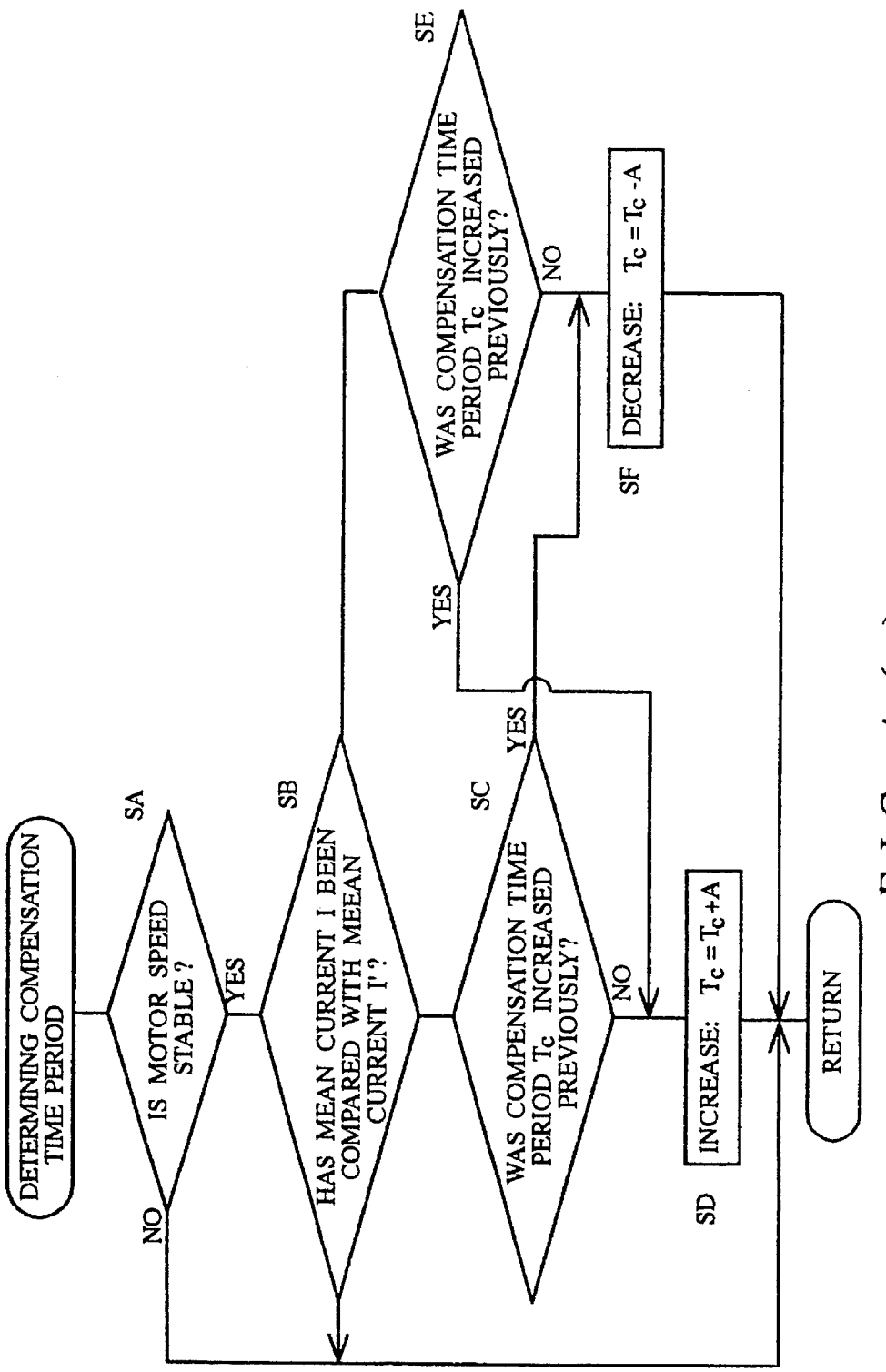

The main routine shown in FIG. 5(a) is the same as shown in FIG. 3. At step ST4, the microcomputer 31 calculates the time period of the second phase segment pattern or the time period measured by the second timing function on the basis of the compensation time period $T_c$ obtained from the tabular data, as described above with reference to FIG. 3. At step ST8, the microcomputer 31 calculates the time period (Z1–Z6) measured by the third timing function.

According to the second embodiment, the commutation timing is caused to occur earlier than that of the prior art inverter described above (the reference commutation timing in the embodiment) by the compensation time period $T_c$ in accordance with the motor speed and load torque. Consequently, the winding current $I_u$ takes an approximately symmetrical waveform about the peak $T_p$ of the induced voltage and is in phase with the induced voltage, as shown in FIGS. 25(a), 25(d) and 25(e). The compensation time period $T_c$ is determined to take an optimum value in accordance with the speed and load torque of the brushless motor 15. Consequently, the commutation timing can be so determined that the winding current is in phase with the induced voltage regardless of the variations in the load torque and the speed of the motor, which can improve the motor efficiency.

Although the tabular data of the compensation time periods $T_c$ is stored in the memory in the second embodiment, data of the compensation time periods $T_c$ converted to electrical angles may be stored in the memory. Furthermore, the compensation time period $T_c$ may be calculated from an equation with the motor speed and load torque as parameters.

Figure 7:
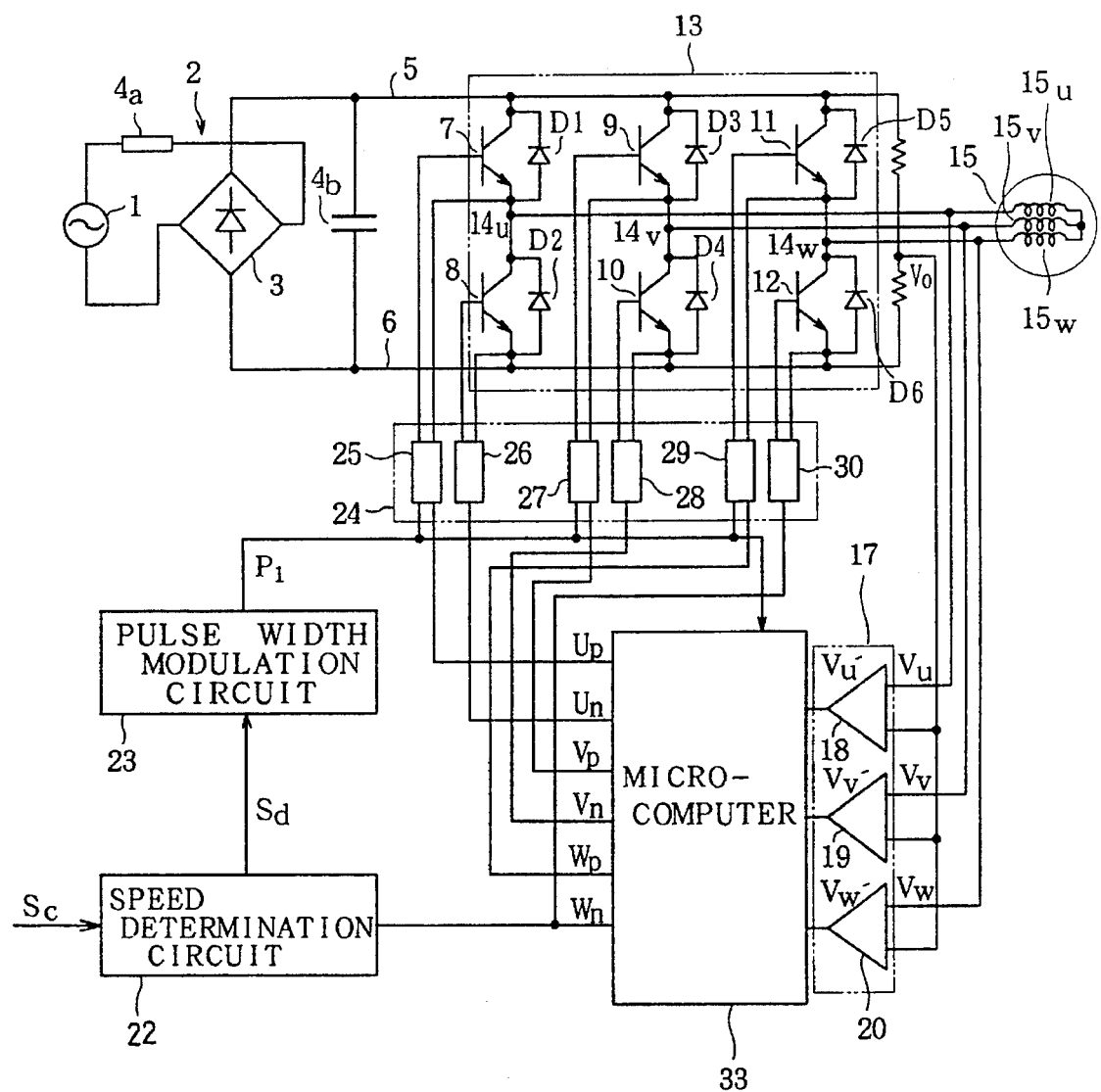
FIG. 7 is an electrical circuit diagram showing the inverter of a third embodiment.
Figure 8:
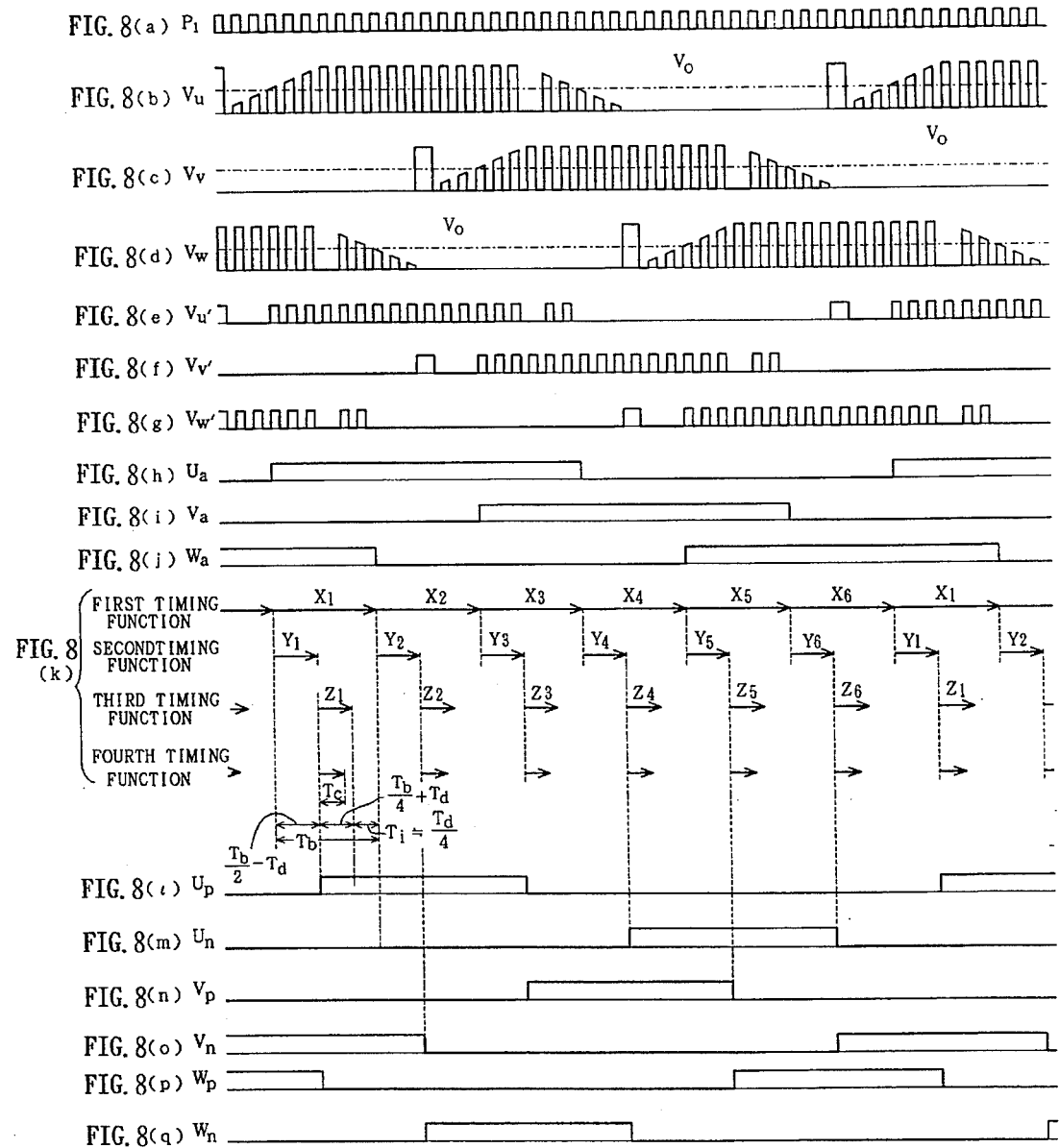
FIGS. 8(a) to 8(q) are waveform charts showing waveforms of various signals and voltages shown in FIG. 7.
Figure 9:
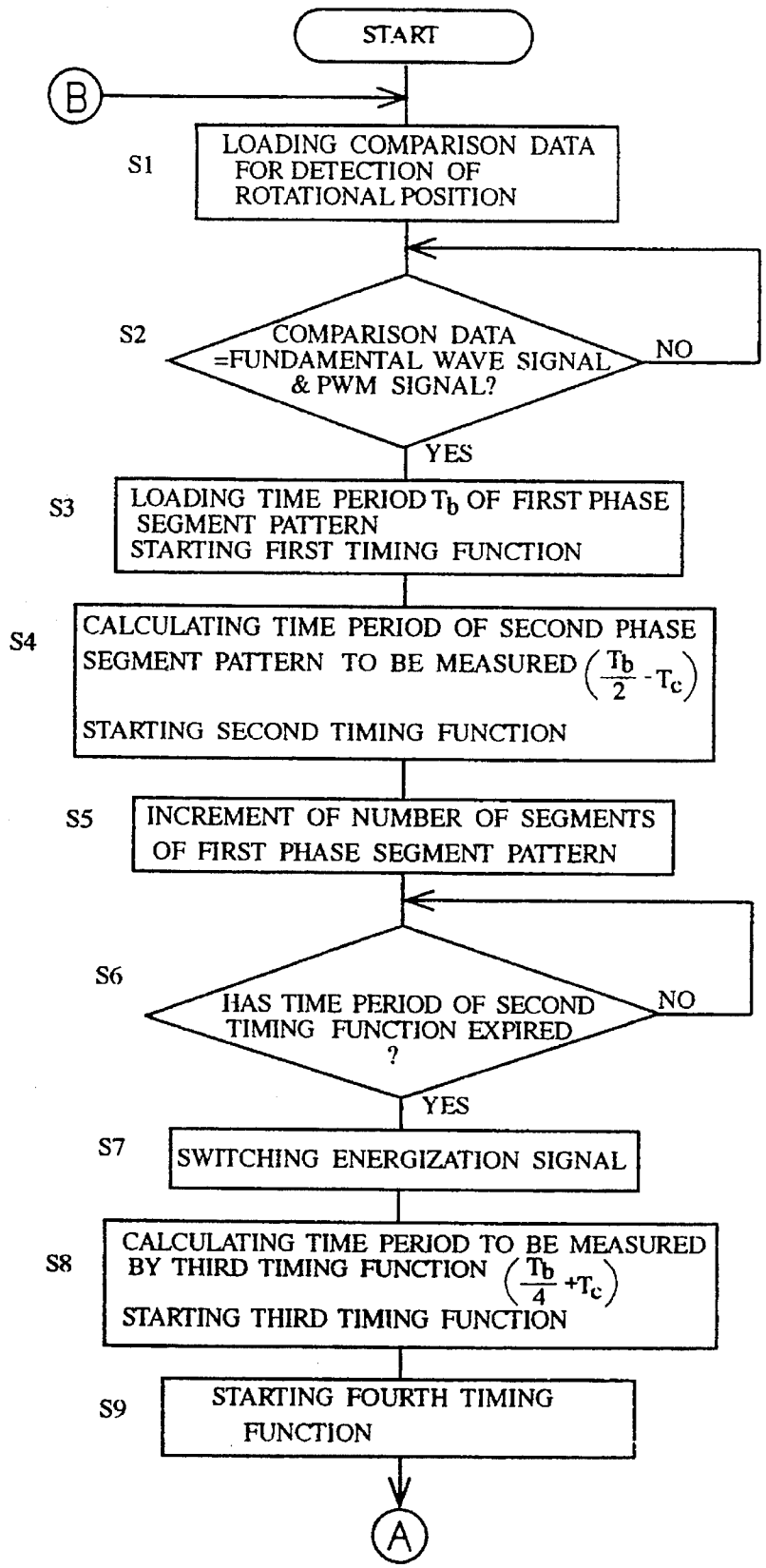
FIG. 9(a) and 9(b) are flowcharts showing an operation of the microcomputer.
Figure 10:
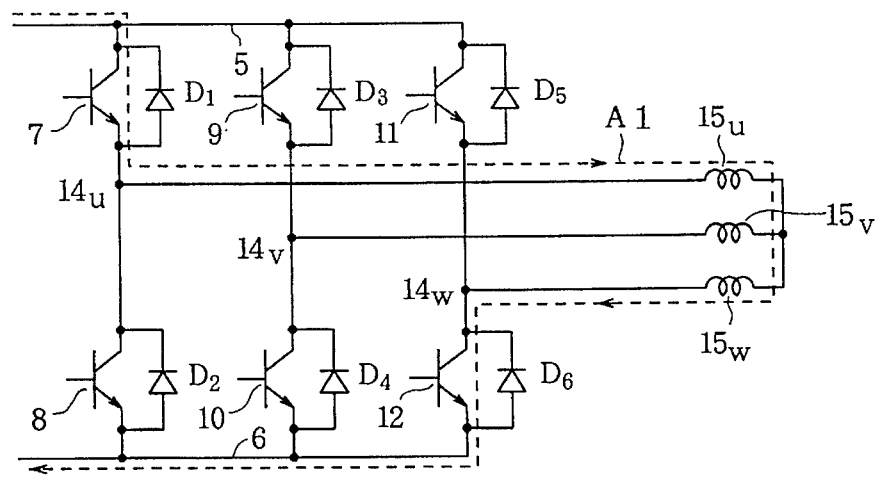
FIGS. 10(a) to 10(c) are circuit diagrams showing an example of current flow at the time of commutation.
Figure 10:
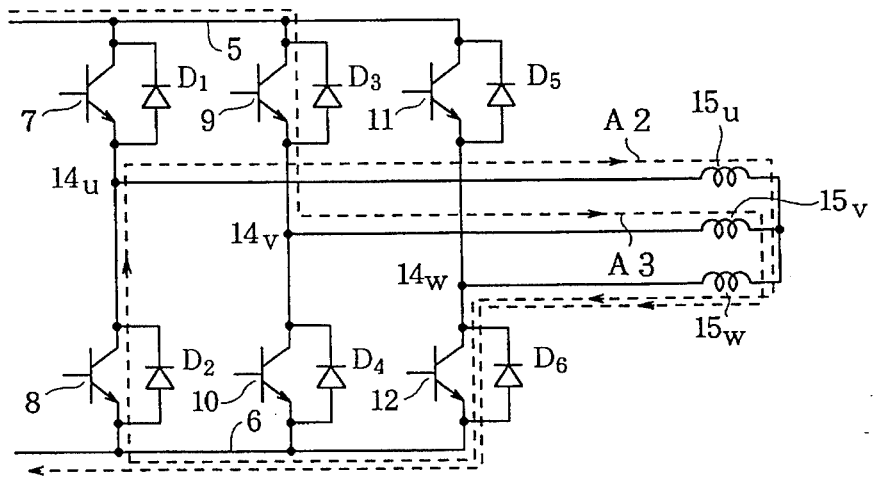
Figure 10:
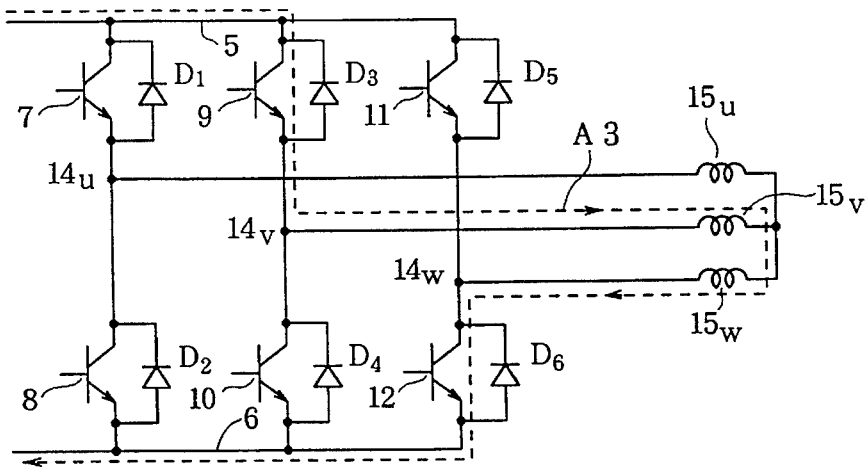
Figure 11:
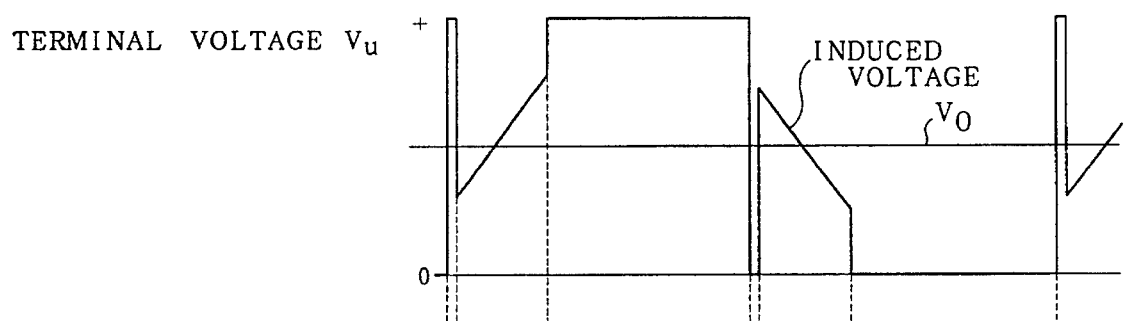
FIGS. 11(a) to 11(c) are waveform charts of the terminal voltage, current and fundamental wave signal at the time of commutation shown in FIG. 10 respectively.
Figure 11:
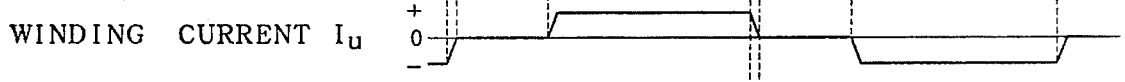
Figure 11:
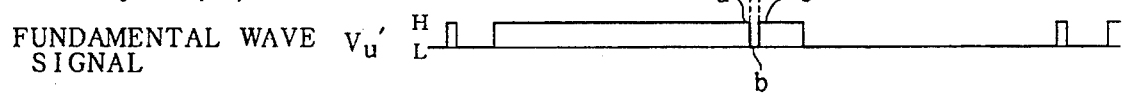
Figure 12:
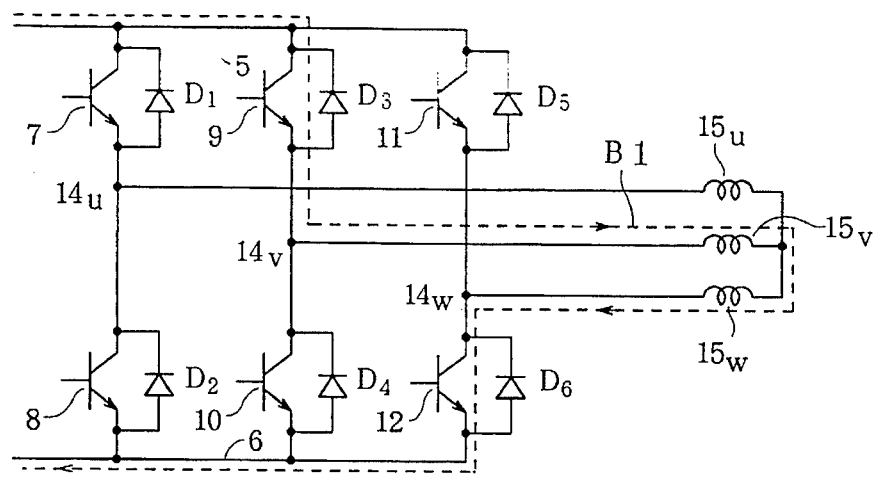
FIGS. 12(a) to 12(c) are circuit diagrams showing another example of current flow at the time of commutation.
Figure 12:
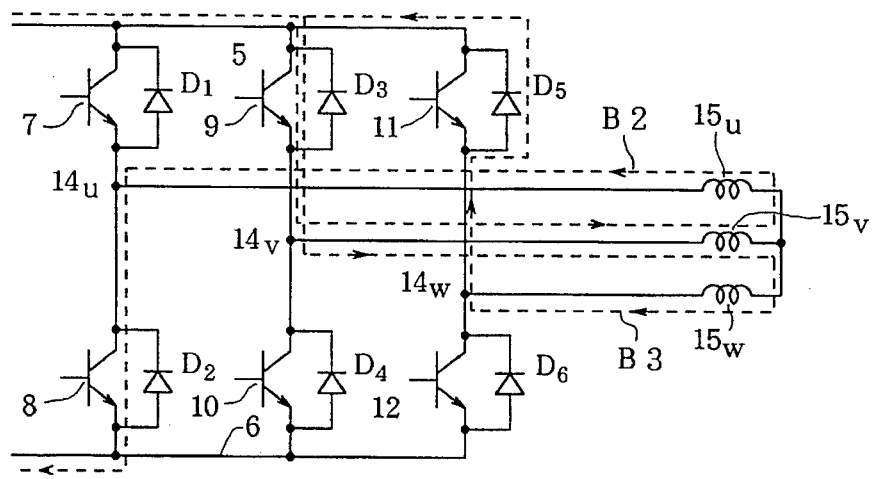
Figure 12:
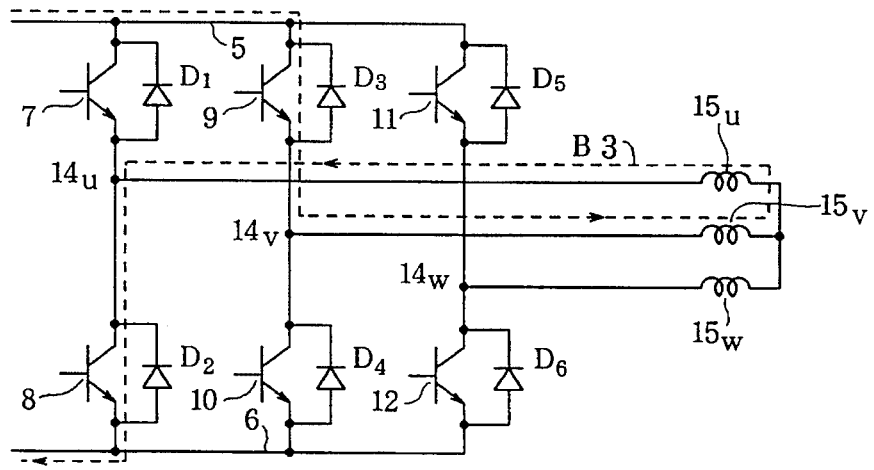
Figure 13:
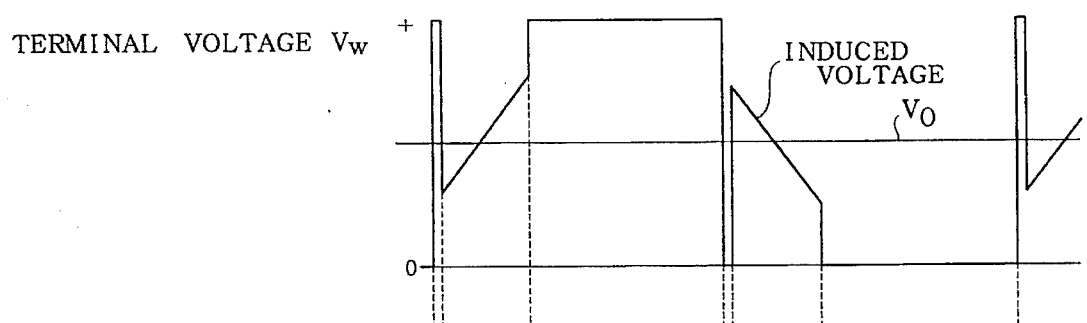
FIGS. 13(a) to 13(c) are waveform charts of the terminal voltage, current and fundamental wave signal at the time of commutation shown in FIG. 12 respectively.
Figure 13:
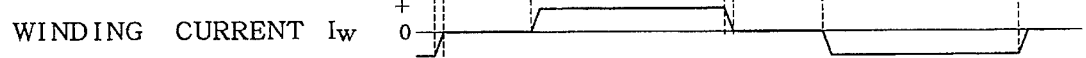
Figure 13:
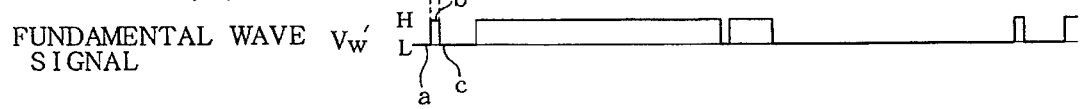

FIGS. 7 to 13(c) illustrate a third embodiment of the invention. The difference between the prior art arrangement shown in FIG. 22 and the third embodiment will be described. Referring first to FIG. 7, the waveform synthesizing circuit 21 as shown in FIG. 22 and serving as the energization signal generating means comprises a microcomputer 33. The microcomputer 33 has a function of changing the commutation timing, a third timing function for recognizing a specified period $T_i$ in the energization period and a fourth timing function serving as commutation time period detecting means for detecting the energization time periods of diodes D1 to D6 as well as all the functions of the waveform synthesizing circuit 21.

The object of the recognition of the specified period $T_i$ is the same as in the first embodiment. Furthermore, the microcomputer 33 inputs the fundamental wave signals $V_u'$, $V_v'$ and $V_w'$ while the time periods Z1–Z6 are being measured by the third timing function. However, the fundamental wave signals $V_u'$, $V_v'$, $V_w'$ are dedicated to the recognition of the commutation completion time but not to the recognition of the zero crossing time while the time periods Z1–Z6 are being measured.

Referring to FIG. 25(b) and 25(c), time lags $T_1$ and $T_2$ at the times of start and termination of voltage application to the winding are due to the fact that the magnetic energy is stored in and released from the winding against the counter electromotive force. Since the energy stored in the winding is approximately the same as the energy released therefrom, the time lag $T_1$ is approximately equal to the time lag $T_2$. Furthermore, a time period necessary for release of the stored energy is approximately equal to a commutation time period of the transistor. Accordingly, the phase lag of the winding current relative to the induced voltage can be solved when the commutation time period of the transistor is measured and the commutation timing is caused to occur earlier by a half of the commutation time period than the time lagging the zero crossing time by 30 degrees or the reference commutation timing.

During the commutation of the transistor, the current due to release of the stored energy flows through the diode connected in parallel to the transistor. In the embodiment, energization time periods of the diodes D1–D6 are detected and the detected energization time periods are used as the commutation time periods of the transistors 7–12 respectively. The terminal voltages of the windings 15u–15w are compared with the reference voltage $V_0$ so that it is recognized that the diodes D1–D6 are being energized.

The following is a reason why the energized state of the diodes D1–D6 can be recognized from the fundamental wave signals $V_u'$, $V_v'$, $V_w'$ generated as the result of the comparison of the terminal voltages of the windings 15u–15w with the reference voltage. The levels of the fundamental wave signals $V_u'$, $V_v'$, $V_w'$ during energization of the diodes D1–D6 differ depending upon the commutated transistor. FIGS. 10(a)–10(c) illustrate one of the cases where the commutation is caused between two of the positive side transistors 7, 9 and 11 when any one of the negative side transistors 8, 10 and 12 is in the "on" period, these cases corresponding to the end points of the second phase segment patterns Y1, Y3 and Y5 in FIG. 8(k). More specifically, FIGS. 10(a)–10(c) show the case where the commutation is initiated at the end point of the second phase segment pattern Y3 or the case where the "on" period of the positive side transistor 7 is terminated (start of the "off" period) during the "on" period of the negative side transistor 12 such that the "on" period of the positive side transistor 9 is initiated. FIG. 10(a) shows the current flow before the commutation, FIG. 10(b) the current flow during the commutation and FIG. 10(c) the current flow after the commutation.

Referring to FIG. 10(a), the current flows through the positive side DC power supply line 5, the transistor 7, the winding 15u, the winding 15w, the transistor 12 and the negative side DC power supply line 6 sequentially in this order as shown by arrow A1 before the commutation. When the transistor 9 is turned on with the transistor 7 turned off such that the commutation is initiated, the current due to the release of stored energy from the winding 15u flows through the winding 15u, the transistor 12, the diode D2 and the winding 15u sequentially in this order as shown by arrow A2 in FIG. 10(b). Simultaneously, a new current flows from the positive side DC power supply line 5 through the transistor 9, the winding 15v, the winding 15w, the transistor 12 and the negative side DC power supply line 6 sequentially in this order as shown by arrow A3 in FIG. 10(c). The current flowing through the path shown by arrow A2 is gradually decreased as the result of the release of stored energy from the winding 15u. The commutation is terminated when the current flowing through the path of arrow A2 ceases to flow. Only the current shown by arrow A3 in FIG. 10(c) flows in the circuit after termination of the commutation.

FIGS. 11(a), 11(b) and 11(c) show waveforms of the terminal voltage $V_u$, the winding current $I_u$ and the fundamental wave signal $V_u'$ respectively in the case without the PWM control, in the period of commutation as described above. Reference characters a, b and c in FIG. 11(c) correspond to the times of FIGS. 10(a), 10(b) and 10(c) respectively. The terminal Voltage $V_u$ is approximately equal to the potential at the positive DC power line 5 before initiation of the commutation since the transistor 7 is turned on. The terminal voltage $V_u$ is approximately equal to the potential at the negative side DC power supply line 6 during the commutation because of conduction of the diode D2. The voltage induced in the winding 15u appears after termination of the commutation. Since the commutation is terminated while the induced voltage is above the reference voltage $V_0$, the fundamental wave signal $V_u'$ resulting from the comparison of the terminal voltage $V_0$ with the reference voltage $V_0$ is maintained at the low level while the current is flowing into the diode D2 or during the commutation. Upon termination of the commutation, the fundamental wave signal $V_u'$ is turned to the high level. Accordingly, a period of the low level state of the fundamental wave signal $V_u'$ starting at the end point of the second phase segment pattern Y3 is measured such that the commutation time period can be detected. Also, the commutation time periods at the end points of the second phase segment patterns Y1 and Y5 can be detected by measuring the time periods of the low level state of the corresponding fundamental wave signals $V_w'$ and $V_v'$ respectively.

On the other hand, FIGS. 12(a)–12(c) illustrate one of the cases where the commutation is caused between two of the positive side transistors 7, 9 and 11 when any one of the negative side transistors 8, 10 and 12 is in the "on" period, these cases corresponding to the end points of the second phase segment patterns Y2, Y4 and Y6 in FIG. 2(k). More specifically, FIGS. 12(a)–12(c) show the case where the commutation is initiated at the end point of the second phase segment pattern Y4 or the case where the "on" period of the negative side transistor 12 is terminated (start of the "off" period) during the "on" period of the positive side transistor 9 such that the "on" period of the negative side transistor 8 is initiated. FIG. 12(a) shows the current flow before the commutation, FIG. 12(b) the current flow during the commutation and FIG. 12(c) the current flow after the commutation.

Referring to FIG. 12(a), the current flows through the positive side DC power supply line 5, the transistor 9, the winding 15v, the winding 15w, the transistor 12 and the negative side DC power supply line 6 sequentially in this order as shown by arrow B1 before the commutation. When the transistor 8 is turned on with the transistor 12 turned off such that the commutation is initiated, the current due to the release of stored energy from the winding 15w flows from the winding 15w through the diode D5, the transistor 9, the winding 15v and the winding 15u sequentially in this order as shown by arrow B2 in FIG. 12(b). Simultaneously, a new current flows from the positive side DC power supply line 5 through the transistor 9, the winding 15v, the winding 15u, the transistor 8 and the negative side DC power supply line 6 sequentially in this order as shown by arrow A3 in FIG. 12(c). The current flowing through the path shown by arrow B2 is gradually decreased as the result of the release of stored energy from the windings 15v and 15w. The commutation is terminated when the current flowing through the path of arrow B2 ceases to flow. Only the current shown by arrow B3 in FIG. 12(c) flows in the circuit after termination of the commutation.

FIGS. 13(a), 13(b) and 13(c) show waveforms of the terminal voltage $V_u$, the winding current $I_u$ and the fundamental wave signal $V_u'$ respectively in the case without the PWM control, in the period of commutation as described above. Reference characters a, b and c in FIG. 13(c) correspond to the times of FIGS. 12(a), 12(b) and 12(c) respectively. The terminal Voltage $V_w$ is approximately equal to the potential at the negative side DC power supply line 6 before initiation of the commutation since the transistor 12 is turned on. The terminal voltage $V_w$ is approximately equal to the potential at the positive side DC power supply line 5 during the commutation because of conduction of the diode D5. The voltage induced in the winding 15w appears after termination of the commutation. The voltage induced at the winding 15w at the time of termination of the commutation is lower than the reference voltage $V_0$. Accordingly, the fundamental wave signal as the result of comparison of the terminal voltage $V_w$ with the reference voltage $V_0$ is maintained at the high level while the current is flowing into the diode D5 or during the commutation. Upon termination of the commutation, the fundamental wave signal $V_w'$ is turned to the low level. Consequently, a period of the high level state of the fundamental wave signal $V_w'$ starting at the end point of the second phase segment pattern Y4 is measured such that the commutation time period can be detected. Also, the commutation time periods at the end points of the second phase segment patterns Y2 and Y6 can be detected by measuring the time periods of the low level state of the corresponding fundamental wave signals $V_v'$ and $V_u'$ respectively. The following TABLE 2 shows the levels of the fundamental wave signals $V_u'$, $V_v'$ and $V_w'$ during the commutation at the end points of the second phase segment patterns Y1–Y6:

TABLE 2

| Commutation period | Level |
| --- | --- |
| Commutation period at the end point of Y1 | Low level of $V_w'$ |
| Commutation period at the end point of Y2 | High level of $V_v'$ |
| Commutation period at the end point of Y3 | Low level of $V_u'$ |
| Commutation period at the end point of Y4 | High level of $V_w'$ |
| Commutation period at the end point of Y5 | Low level of $V_v'$ |
| Commutation period at the end point of Y6 | High level of $V_u'$ |

Since the first phase segment patterns X1–X6 include the end points of the second phase segment patterns Y1–Y6 respectively, the levels of the fundamental wave signals $V_u'$, $V_v'$, $V_w'$ and the PWM signal $P_1$ at the time of termination of the commutation performed once within each of the first phase segment patterns X1–X6 are shown by the following TABLE 3:

TABLE 3

| First phase segment pattern | $V_u'$ | $V_v'$ | $V_w'$ | $P_1$ |
| --- | --- | --- | --- | --- |
| X1 | High | Low | High | High |
| X2 | High | Low | Low | High |
| X3 | High | High | Low | High |
| X4 | Low | High | Low | High |
| X5 | Low | High | High | High |
| X6 | Low | Low | High | High |

The microcomputer 33 is incorporated with a memory storing data of the signal levels shown in TABLE 3 in relation with the first phase segment patterns X1–X6 as well as data of signal levels shown in TABLE 1.

The operation of the microcomputer 33 will be described. In the embodiment, the microcomputer 33 determines the time lagging behind the zero crossing time by a period corresponding to an electrical angle of 30 degrees to be a reference commutation timing. Furthermore, the commutation time period $T_e$ is measured and the commutation timing is so set as to occur earlier by a half of the measured commutation time period $T_e$ or the compensation time period $T_c$ than the reference commutation timing.

This will be described with reference to FIGS. 9(a) and 9(b). Since the steps S1 to S8 are the same as those in the flowchart of FIG. 3, the description starts with the step S9. The energization signal is switched (step S7) and the third timing function starts (step S8) when the second timing function has completed measurement of the time period, $[(T/2)-T_c]$ (commutation timing). At step S9, the fourth timing function starts for measurement of the commutation time period. The microcomputer 33 loads the comparison data (see TABLE 3) for detection of termination of the commutation within the current first phase segment pattern for the purpose of detecting the time of termination of the commutation (step S10). At step S11, the levels of the fundamental wave signals $V_u'$, $V_v'$, $V_w'$ and the PWM signal $P_1$ are compared with the loaded comparison data.

Upon termination of the commutation, the states of the fundamental wave signals $V_u'$, $V_v'$, $V_w'$ and the PWM signal $P_1$ correspond to those of the comparison data respectively. The microcomputer 33 determines in the affirmative at step S11 and then advances to step S12 where it loads data of the commutation time period $T_e$ measured by the fourth timing function. At step S13, the compensation time period $T_c$ is calculated from the following equation (5):

$$T_c = T_e/2. \tag{5}$$

When the measurement of the time period set at step S8 is completed by the third timing function and the time is within the specified period $T_f$ (step S14), the microcomputer 33 returns to step S1 where it loads the comparison data for detection of the rotational position for first phase segment pattern being in progress, which data has been incremented at step S5. After executing steps S1 to S3 sequentially, the microcomputer 33 calculates the time period of the second phase segment pattern to be measured by the second timing function, on the basis of the obtained compensation time period $T_c$, at step S4. Consequently, the commutation timing is compensated so as to occur at a time earlier by the compensation time period $T_c$ than the time lagging behind the zero crossing time by 30 degrees.

According to the above-described embodiment, the commutation timing is caused to occur at the time earlier by the compensation time period $T_c$ than the time lagging behind the zero crossing time by 30 degrees. Since the compensation time period $T_c$ corresponds to a half of the commutation time period actually measured, this means that the lag time $T_1$ or $T_2$ shown in FIG. 25(c) is measured and the compensation time period $T_c$ is set to be a half of the lag time. Consequently, the current waveforms of the windings 15u, 15v, 15w are symmetrical about the peak $T_p$ of the induced voltage or in phase with the induced voltage as shown in FIG. 25(e) even when the lag times $T_1$, $T_2$ vary with the load torque or motor speed. The power factor is thus improved and the efficiency of the brushless motor 15 is improved.

The first to fourth timing functions may be performed by independent timers respectively. However, the second timing function is not executed simultaneously with the third or fourth timing function. Accordingly, the number of the timers can be reduced when a timer employed for the third or fourth timing function is arranged to also perform the second timing function.

In the foregoing first embodiment, the positive side transistors 7, 9, 11 are controlled to be turned on and off by the PWM signal $P_1$. Since the period of the PWM signal $P_1$ is shorter than the commutation time period, the commutation time period $T_e$ measured as the energization time period of each diode D1–D6 becomes approximately equal to an actual commutation time period. However, the period of the PWM signal $P_1$ is rendered long for the purpose that the loss in the switching operation of each of the transistors 7–12 is reduced or for other purposes. In this case, the commutation time period $T_e$ detected by comparison of the terminal voltage with the reference voltage does not equal the actual commutation time period. This will be described in detail with reference to FIGS. 14(a) to 14(f).

FIGS. 14(a)–14(f) show a case where the commutation is performed between two of the positive side transistors 7, 9 and 11 while any one of the negative side transistors 8, 10 and 12 is on. The case corresponds to the end points of the second phase segment patterns Y1, Y3 and Y5 shown in FIG. 8(k). More specifically, FIGS. 14(a)–14(c) and 14(d)–14(f) show the respective waveforms of the terminal voltage $V_u$ and fundamental wave signal $V_u'$ in relation to the PWM signal $P_1$ in the commutation (same as in FIGS. 10(a)–10(c)) at the end point of the second phase segment pattern Y3. FIGS. 14(a)–14(c) show the case where the commutation is completed while the PWM signal $P_1$ is at the high level. On the other hand, FIGS. 14(d)–14(f) show the case where the commutation is completed while the PWM signal $P_1$ is at the low level. Reference symbols $t_s$ and $t_e$ refer to the commutation timing and the actual time of completion of the commutation respectively. The commutation completion time $t_e$ is within the high level period of the PWM signal $P_1$, in which high level period the transistor 9 is on. Accordingly, the terminal voltage $V_u$ rises simultaneously with the completion of the commutation, taking a value of the reference voltage $V_0$ or above. In this case, since the fundamental wave signal $V_u'$ turns from the low level to the high level, the measured commutation time period $T_e$ corresponds to the actual one. However, the commutation completion time $t_e$ is within the low level period of the PWM signal $P_1$ in the case shown in FIGS. 14(d)–14(f), in which low level period the transistor 9 is off. Accordingly, the terminal voltage remains at the potential of the negative side DC power supply line 6 even when the commutation is completed. In this case, the terminal voltage $V_u$ rises to take the value of the reference wave signal $V_u'$ or above only when the PWM signal $P_1$ turns to the high level. Consequently, the measured commutation time period does not equal the actual one.

When the commutation occurs between two of the negative side transistors 8, 10 and 12 (the case shown in FIGS. 12(a)–12(c), for example), the energy stored in the winding flows into the positive side DC power supply line 5 through the diode connected in parallel to the positive side transistor. Accordingly, the winding terminal voltage on the basis of which the completion of the commutation is detected is at the potential of the positive side DC power supply line 5 during the commutation. Upon completion of the commutation, the winding terminal voltage is at the potential of the induced voltage when the positive side transistor is on or at the potential of the negative side DC power supply line 6 when the positive side transistor is off. In each case, the terminal voltage is below the reference voltage $V_0$. Accordingly, when the commutation occurs between two of the negative side transistors 8, 10, 12, the fundamental wave signal is at the high level during the commutation and turns to the low level upon completion of the commutation, regardless of the "on" or "off" state of the positive side transistor under the control of the PWM signal $P_1$. Consequently, the time of completion of the commutation can be accurately detected and there is no time difference between the measured commutation time period $T_e$ and the actual one.

Figure 15:
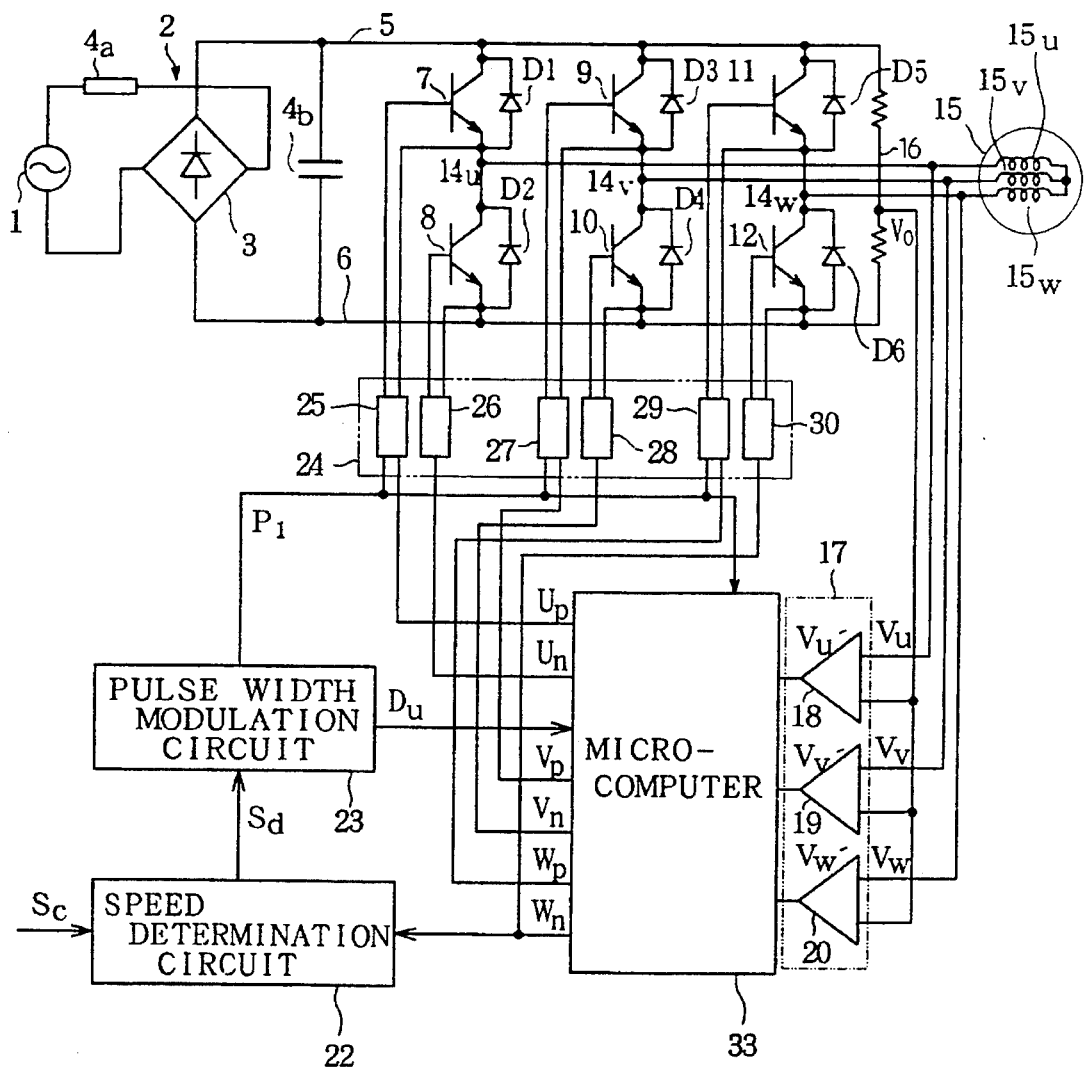
FIG. 15 is a circuit diagram showing the inverter of a fourth embodiment.

The following fourth and fifth embodiments are directed to the solution of the above-described problem that the measured commutation time period does not equal the actual one. Referring to FIG. 15 showing the fourth embodiment, the pulse width modulation circuit 23 determines the duty ratio $D_u$ of the PWM signal $P_1$ on the basis of the duty ratio signal $S_d$, supplying the duty ratio $D_u$ to the microcomputer 33. The microcomputer 33 has a memory previously storing the period $T_p$ of the PWM signal $P_1$. The microcomputer 33 performs the following calculation to obtain the compensation time period $T_c$ from the period $T_p$ and the duty ratio $D_u$ of the PWM signal $P_1$ at step S13 of the flowchart of FIG. 9(b), so that the time difference does not occur between the commutation time period measured by the fourth timing function and the actual one. More specifically, an average value $T_{eAVE}$ of the measured commutation time periods $T_e$ is rendered longer than the actual commutation time period $T_E$ by a period shown by the following equation (6):

$$T_{eAVE} - TE = (1-D_u)^2 \cdot T_p/2. \qquad (6)$$

The right side of the equation (6) represents an average value of the low-level time periods of the PWM signal $P_1$. For example, the commutation time period $T_e$ is measured at twelve times (one turn and a half in the four pole motor) and the average value $T_{eAVE}$ is obtained and then, the actual commutation time period $T_E$ is obtained from the following equation (7):

$$T_E = T_{eAVE} - (1-D_u)^2 \cdot T_p/2. \qquad (7)$$

Then, the compensation time period $T_c$ is set at a half of the commutation time period $T_E$ obtained from the equation (7). As the result of the above-described arrangement, the commutation time period $T_e$ measured by the fourth timing function can be compensated to become approximately equal to the actual commutation time period eve when the time difference occurs between the commutation time period measured by the fourth timing function and the actual one.

FIGS. 16 to 19(b) illustrate the fifth embodiment. The difference between the circuit arrangement shown in FIG. 16 and that in FIG. 7 will first be described. The microcomputer 33 shown in FIG. 16 has a function of selection signal generating means as well as those of the microcomputer shown in FIG. 7. The microcomputer 33 generates a selection signal $S_p$ whose level is turned between the high and low levels when the energization signals $U_p$, $U_n$, $V_p$, $V_n$, $W_p$ and $W_n$ are switched.

The selection signal $S_p$ is provided so that the negative side transistor which is then in the "on" period is controlled in accordance with the PWM signal $P_1$ in the occurrence of the commutation between two of the positive side transistors 7, 9, 11 and so that positive side transistor which is then in the "on" on period is controlled in accordance with the PWM signal $P_1$ in the occurrence of the commutation between two of the negative side transistors 8, 10, 12. The selection signal $S_p$ is turned from the high level to the low level in the occurrence of the commutation between two of the positive side transistors 7, 9, 11 and is turned from the low level to the high level in the occurrence of the commutation between two of the negative side transistors 8, 10, 12.

Figure 16:
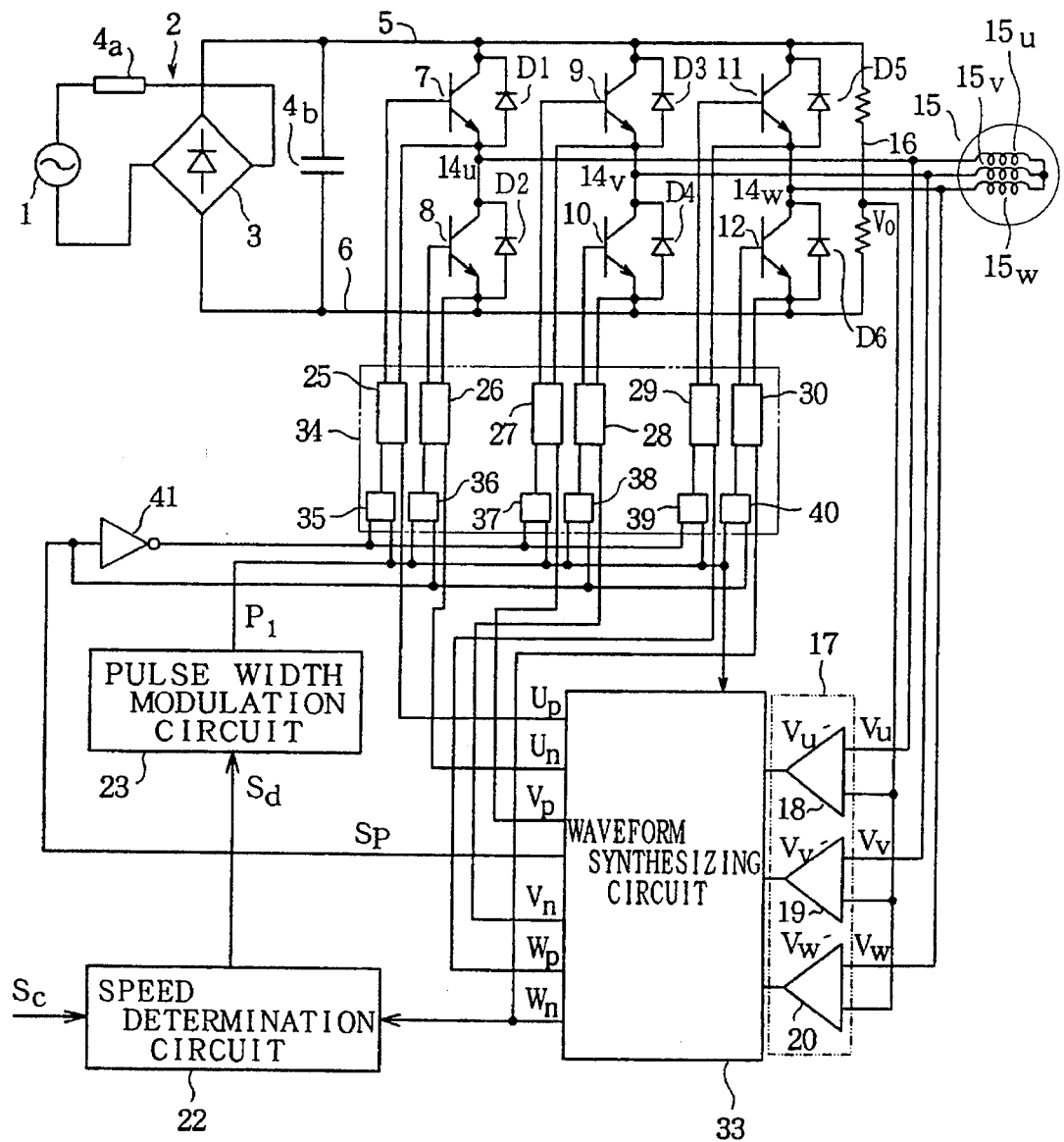
FIG. 16 is a circuit diagram showing the inverter of a fifth embodiment.
Figure 19:
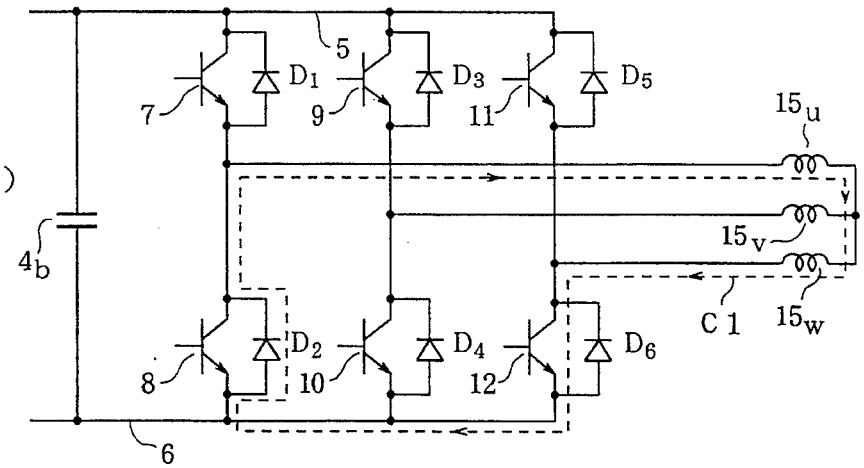
FIGS. 19(a) and 19(b) are circuit diagrams showing the current flow at the time of commutation.
Figure 19:
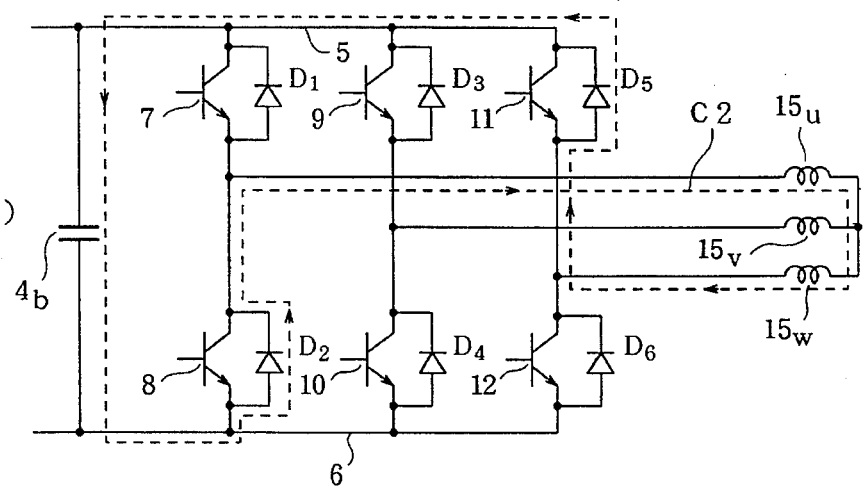

A gate circuit 34 serving as drive means includes six gates 25 to 30 each comprising an AND circuit and six gates 35 to 40 each comprising a gate circuit, for example, as shown in FIG. 16. The selection signal $S_p$ is supplied to the gate circuits 36, 38 and 40 corresponding to the negative side transistors 8, 10, 12 respectively. Furthermore, the selection signal $S_p$ is supplied to a NOT circuit 41 reversing its level and then, to the gate circuits 35, 37, 39 corresponding to the positive side transistors 7, 9, 11 respectively. The selection signal $S_p$ is ORed with the PWM signal $P_1$ by the gate circuits 35–40 and then, is supplied to each of the gates 25–30. On the other hand, the energization signals $U_p$, $U_n$, $V_p$, $V_n$, $W_p$ and $W_n$ are supplied to the gates 25–30 respectively and then, are ANDed with output signals of the gate circuits 35–40 respectively, being supplied as base signals to the bases of the respective transistors 7–12 of the three-phase bridge circuit 13.

When the selection signal $S_p$ is at the low level, each of the gate circuits 35, 37, 39 delivers the high level signal and each of the gate circuits 36, 38, 40 repeatedly delivers high-level and low-level signals in accordance with the PWM signal. Consequently, the positive side transistors 7, 9, 11 are controlled to be turned on and off by the energization signals $U_p$, $V_p$, $W_p$ while the negative side transistors 8, 10, 12 are controlled to be turned on and off by the PWM signal P1 and the energization signals $U_n$, $V_n$, $W_n$.

When the selection signal $S_p$ is at the high level, the output states of the gate circuits 35–40 are reversed such that the negative side transistors 8, 10, 12 are controlled to be turned on and off by the energization signals $U_n$, $V_n$, $W_n$ and the positive side transistors 7, 9, 11 are controlled to be turned on and off by the PWM signal $P_1$ and the energization signals $U_n$, $V_n$, $W_n$. Thus, the positive side transistors 7, 9, 11 and the negative side transistors 8, 10, 12 are alternately controlled in accordance with the PWM signal such that the terminal voltages $V_u$, $V_v$, $V_w$ take the waveforms shown in FIGS. 17(b)–17(d) respectively.

According to the fifth embodiment, the commutation completion time can be accurately detected on the basis of the terminal voltages of the respective windings 15u, 15v, 15w in the occurrence of the commutation between two of the positive side transistors 7, 9, 11 even when the commutation completion time is within the low-level period of the PWM signal $P_1$. This will be described with reference to FIGS. 18(a)–18(f), 19(a) and 19(b). FIGS. 18(a)–18(f) illustrate the states corresponding to those shown in FIGS. 14(a)–14(f) respectively. When the commutation occurs between the positive side transistors 7 and 9, the negative side transistor 12 which is then on is controlled to be turned on and off by the PWM signal $P_1$ and the commutated positive side transistor 9 remains in the "on" state while in FIGS. 14(a)–14(f), the positive side transistor 9 which is turned on is controlled by the PWM signal.

Consequently, the current due to the energy stored in the winding 15u flows from the winding 15u through the winding 15w, the transistor 12, the negative DC power line 6, the diode D2 and the winding 15u in this sequence when the negative side transistor 12 is on during the commutation, as shown by arrow C1 in FIG. 19(c). Upon turnoff of the negative side transistor 12, the current due to the energy stored in the winding 15u flows from the winding 15u through the winding 15w, the diode D5, positive side DC power supply line 5, the capacitor 4b, the negative side DC power supply line 6, the diode D2 and the winding 15u in this sequence, as shown by arrow C2 in FIG. 19(b). Accordingly, the terminal voltage of the winding 15u remains at the potential of the negative side DC power supply line 6 because of conduction of the diode D2 during the commutation even if the negative side transistor 12 is turned on and off by the PWM signal $P_1$.

Since the positive side transistor 9 remains in the "on" state, the voltage induced at the winding 15u appears as the terminal voltage thereof when the commutation is completed while the negative side transistor 12 is in the "on" state with the PWM signal being the high level state, as shown in FIG. 19(a). When the commutation is completed while the negative side transistor 12 is in the "off" state, the potential at the positive side DC power supply line 5 appears, as shown in FIG. 19(b). Consequently, the time when the fundamental wave signal $V_u'$ has turned from the low to the high level can be accurately detected as the commutation completion time since the terminal voltage $V_u$ rises from the potential at the negative side DC power supply line 6 to the level of the reference voltage $V_0$ or above upon completion of the commutation. The commutation time period $T_e$ measured by the fourth timing function thus equals the actual commutation time period.

Figure 20:
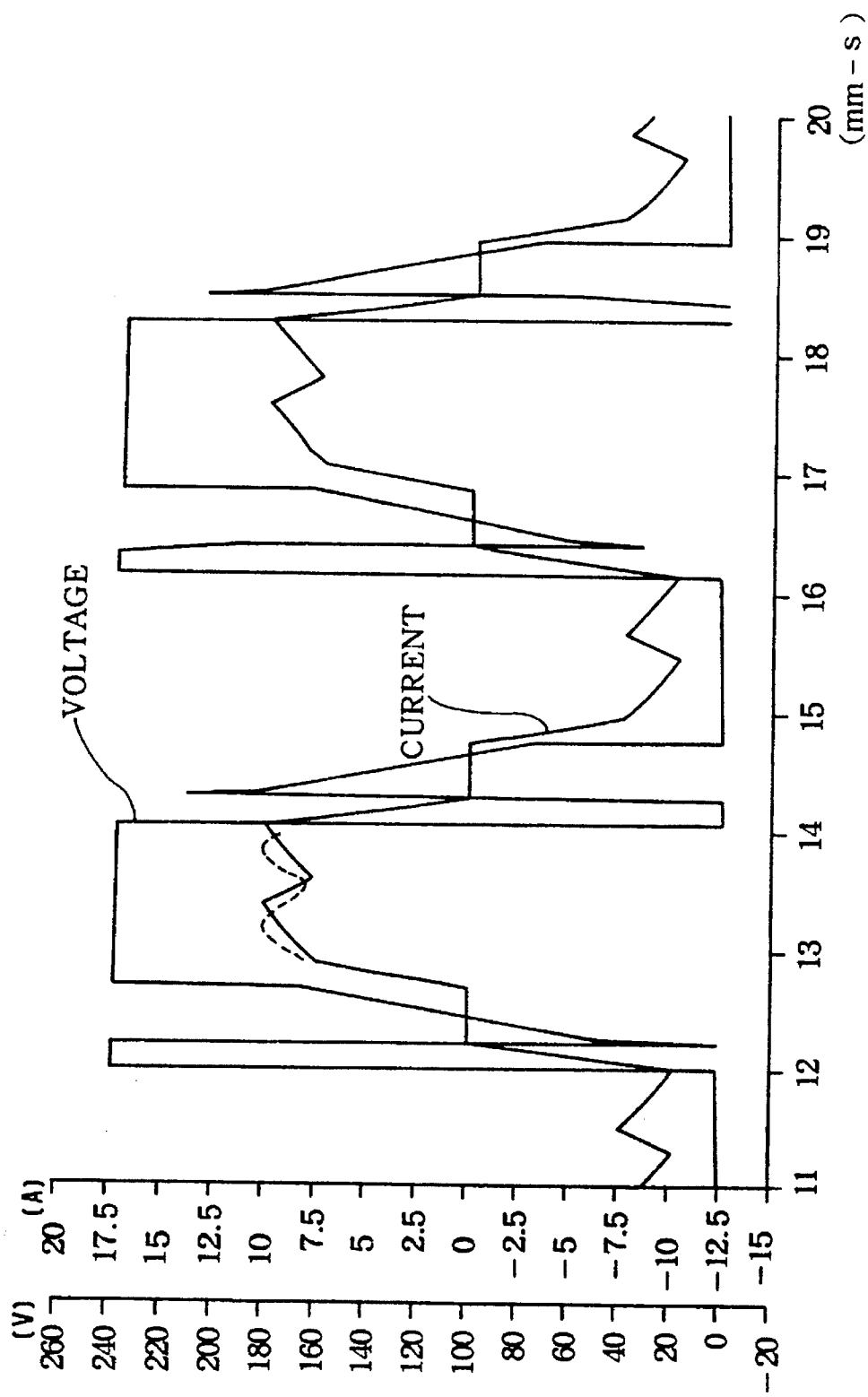
FIG. 20 is a waveform chart showing the terminal voltage and current in an electric motor having a large time constant.

In the case of a motor whose winding has a large electrical time constant (reactance/resistance), the current waveform shown by solid line in FIG. 20 distorts in the direction of lag as compared with the current wave form (broken line) in the case of the motor whose winding has a small electrical time constant. The motor efficiency can be improved when the commutation timing is so determined that the compensation time period is set to be longer than a half of the commutation time period $T_e$. Accordingly, when the motor with a large electrical time constant is driven at a fixed speed, the compensation time period $T_c$ may be calculated from the following equation (8) using the constant $K_s$ obtained experimentally or theoretically:

$$T_c = K_s \cdot T_e. \qquad (8)$$

Furthermore, when the motor with a large electrical time constant is used in the variable speed mode, a variable $K_r$ in accordance with the motor speed is obtained experimentally or theoretically and tabular data of the variable $K_r$ is stored in a memory or is determined from the following equation (9):

$$K_r = A \cdot N + B \qquad (9)$$

where A and B are constants and N is a motor speed. And then, the compensation time period $T_c$ is calculated from the equation (10):

$$T_c = K_r \cdot T_e. \qquad (10)$$

Although the rotational position of the rotor is detected by comparison of the terminal voltages $V_u$, $V_v$, $V_w$ of the respective windings 15u, 15v, 15w with the reference voltage $V_0$ in each of the foregoing embodiments, the terminal voltage may be converted by a filter circuit to a sinusoidal voltage signal, which sinusoidal voltage signal may be used to detect the rotational position of the rotor, as is disclosed in Japanese unexamined patent application publication No. 59-162793 (1984).

Figure 21:
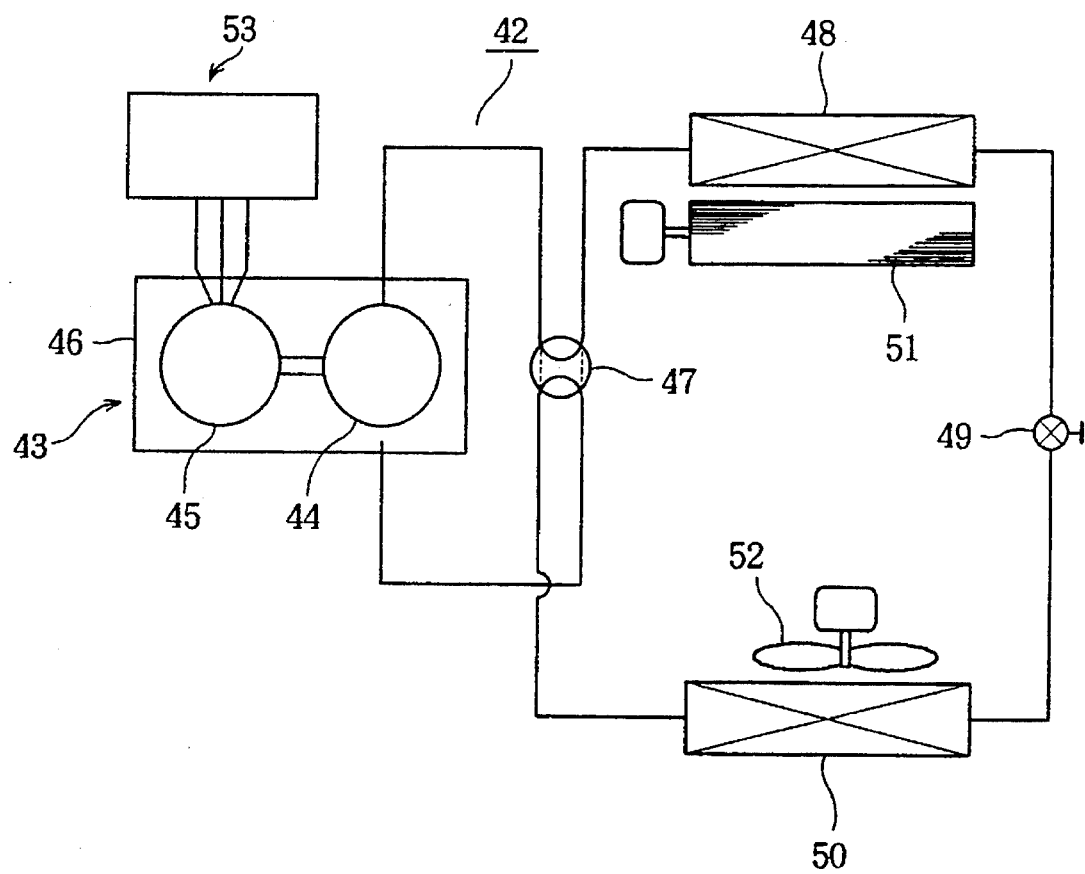
FIG. 21 schematically shows a heat pump of an air conditioner controlled by the inverter of a sixth embodiment.

FIG. 21 illustrates a sixth embodiment of the invention. In the sixth embodiment, the brushless motor employed as a compressor motor in an air conditioner is controlled by the inverter of each of the foregoing embodiments. A heat pump 42 includes a compressor 43 comprised of a closed iron container enclosing a compressing section 44 and a brushless motor 45. The brushless motor 45 has a rotor shaft coupled to the compressing section 44. The compressor 43, a four way type valve 47, an indoor side heat exchanger 48, a pressure reducing device 49 and an outdoor side heat exchanger 50 are connected by a pipe serving as a refrigerant path so that a closed loop is provided.

In a warming operation, the four way type valve 47 is switched to the state as shown by solid line in FIG. 21 such that high temperature refrigerant compressed by the compressing section 44 of the compressor 43 is supplied through the four way type valve 47 to the outdoor side heat exchanger 50 in which the refrigerant is compressed. Thereafter, the pressure of the compressed refrigerant is reduced by the pressure reducing device 49. The low temperature refrigerant is caused to flow into the outdoor side heat exchanger 50 where the refrigerant is evaporated to be returned to the compressor 43.

In a cooling operation, the four way type valve 47 is switched to the state as shown by broken line in FIG. 21 such that high temperature refrigerant compressed by the compressing section 44 is supplied through the four way type valve 47 to the outdoor side heat exchanger 50 in which the refrigerant is compressed. The pressure of the compressed refrigerant is then reduced by the pressure reducing device 49. The low temperature refrigerant is supplied to the indoor side heat exchanger 48 where the refrigerant is evaporated to be returned to the compressor 43.

Fans 51 and 52 are provided to feed air to the outdoor and indoor side heat exchangers 48, 50 respectively so that heat exchange is efficiently caused between the heat exchangers 48, 50 and the indoor and outdoor air respectively.

The brushless motor 45 of the compressor 43 in the above-described heat pump 41 is controlled by the inverter of each of the foregoing embodiments. Accordingly, the winding current is controlled to be in phase with the voltage induced at the winding even when the rotational speed and load of the brushless motor 45 vary with the outdoor temperature, the difference between the indoor temperature set by the user and the actual indoor temperature, the difference between the indoor and outdoor temperatures, and the like. Consequently, air conditioner can be efficiently operated.

The foregoing disclosure and drawings are merely illustrative of the principles of the present invention and are not to be interpreted in a limiting sense. The only limitation is to be determined from the scope of the appended claims.

I claim:

1. An inverter comprising:

a switching circuit including a plurality of switching elements sequentially energizing windings of a plurality of phases of an electric motor;

a pulse width modulation circuit for obtaining a pulse width modulated signal;

electrical quantity detecting means for detecting a quantity of electricity supplied to the switching circuit, thereby generating an electrical quantity signal;

position detecting means for detecting a rotational position of a rotor of the motor, thereby providing information about the rotational position of the rotor;

energization signal generating means for generating an energization signal at a time according to a commutation timing necessary for the switching circuit on the basis of the information about the rotational position of the rotor, the energization signal generating means comprising means for obtaining a reference commutation timing from the information about the rotational position of the rotor, electrical quantity comparing means for sequentially sampling the electrical quantity signals generated by the electrical quantity detecting means to thereby obtain a mean electrical quantity value and comparing the mean electrical quantity value with a last mean electrical quantity value, and compensation means for compensating the commutation timing so that the commutation timing corresponds to a point of time preceding the reference commutation timing by a predetermined compensation period of time, the compensation means changing the predetermined compensation time period in accordance with the result of comparison by the electrical quantity comparing means; and drive means synthesizing the energization signal and the pulse width modulated signal for driving each switching element.

2. An inverter comprising:

a switching circuit including a plurality of switching elements sequentially energizing windings of a plurality of phases of an electric motor;

a pulse width modulation circuit for obtaining a pulse width modulated signal;

position detecting means for detecting a rotational position of a rotor of the motor, thereby providing information about the rotational position of the rotor;

speed detecting means for detecting a rotational speed of the rotor of the motor;

means for determining a duty ratio of the pulse width modulated signal on the basis of a result of comparison of the detected rotational speed of the rotor with an externally supplied speed command;

energization signal generating means for generating an energization signal at a time according to a commutation timing necessary for the switching circuit on the basis of the information about the rotational position of the rotor, the energization signal generating means comprising means for obtaining a reference commutation timing from the information about the rotational position of the rotor and compensation means for compensating the commutation timing so that the commutation timing corresponds to a point of time preceding the reference commutation timing by a predetermined compensation period of time, the compensation means changing the predetermined compensation time period on the basis of the detected rotational speed of the rotor and the determined duty ratio of the pulse width modulated signal; and drive means synthesizing the energization signal and the pulse width modulated signal for driving each switching element.

3. An inverter according to claim 2, which further comprises a memory for storing tabular data of the compensation time periods in connection with the rotational speed of the rotor and the duty ratio of the pulse width modulated signal and wherein the energization signal generating means selects the compensation time period corresponding both to the rotational speed of the rotor and to the duty ratio of the pulse width modulated signal from the tabular data to thereby determine the compensation time period.

4. An inverter according to claim 1 or 2, wherein the position detecting means supplies the energization signal generating means with, as the information about the rotational position of the rotor, a time when a terminal voltage of the motor winding intersects a reference voltage set at a half of a direct current power supply voltage supplied to the switching circuit and the energization signal generating means comprises a first timer timing a period between the time when the winding terminal voltage intersects the reference voltage and a subsequent time of intersection, operational means for operating a period of time between the time when the winding terminal voltage intersects the reference voltage and a reference commutation timing on the basis of the time period obtained by the first timer, thereby subtracting a compensation time period from the obtained time period to obtain a post-compensation time period, and a second timer initiating a timing operation at the time when the winding terminal voltage intersects the reference voltage, the commutation timing being determined to be a time when the second timer has completed a timing operation for the post-commutation time period.

5. An inverter comprising:
  a) a switching circuit including a plurality of switching elements sequentially energizing windings of a plurality of phases of an electric motor, the switching elements having respective diodes connected in parallel thereto;
  b) a pulse width modulation circuit for obtaining a pulse width modulated signal;
  c) position detecting means for detecting a rotational position of a rotor of the motor, thereby providing information about the rotational position of the rotor;
  (d) commutation time period detecting means detecting an energization time period of each diode due to release of energy stored in each motor winding while the corresponding switching element is being commutated, the detected energization time period of each diode serving as a commutation time period of the corresponding switching element;
  (e) energization signal generating means determining a commutation timing on the basis of the information about the rotational position of the rotor and the commutation time period of each switching element, thereby generating an energization signal corresponding to the determined commutation timing; and
  (f) drive means synthesizing the energization signal and the pulse width modulated signal for driving each switching element.

6. An inverter according to claim 5, wherein the commutation time period detecting means compares the terminal voltage of each motor winding with a reference voltage to detect the energization of each diode.

7. An inverter comprising:
  a) a switching circuit including a plurality of switching elements sequentially energizing windings of a plurality of phases of an electric motor, the switching elements having respective diodes connected in parallel thereto;
  b) a pulse width modulation circuit for obtaining a pulse width modulated signal;
  c) position detecting means for detecting a rotational position of a rotor of the motor, thereby providing information about the rotational position of the rotor;
  d) commutation time period detecting means comparing a terminal voltage of each motor winding with a reference voltage for detecting an energization time period of each diode due to release of energy stored in each motor winding while the corresponding switching element is being commutated, the commutation time period detecting means compensating the detected energization time period of each diode on the basis of a period and duty ratio of the pulse width modulated signal, thereby determining a commutation time period of each switching element;
  e) energization signal generating means determining a commutation timing on the basis of the information about the rotational position of the rotor and the commutation time period of each switching element, thereby generating an energization signal corresponding to the determined commutation timing; and
  f) drive means synthesizing the energization signal and the pulse width modulated signal for driving each switching element.

8. An inverter comprising:
  a) a switching circuit including a plurality of positive side switching elements each having a diode connected in parallel thereto between a positive direct current power supply line and each winding terminal of an electric motor and a plurality of negative side switching elements each having a diode connected in parallel thereto between a negative direct current power supply line and each motor winding terminal so that windings of a plurality of phases of the motor are sequentially energized;
  b) a pulse width modulation circuit for obtaining a pulse width modulated signal;
  c) position detecting means for detecting a rotational position of a rotor of the motor, thereby providing information about the rotational position of the rotor;
  d) commutation time period detecting means comparing a terminal voltage of each motor winding with a reference voltage to detect an energized state of each diode due to discharge of energy stored in each motor winding while the corresponding switching element is being commutated, thereby determining a commutation time period of each switching element on the basis of a time period of operation of detecting the energized state of each diode;
  e) energization signal generating means determining a commutation timing on the basis of the information about the rotational position of the rotor and the commutation time period of each switching element, thereby generating an energization signal corresponding to the determined commutation timing;
  f) selection signal generating means for generating a selection signal so that either the positive or the negative side switching elements are selected to be thereby controlled to be turned on and off by the pulse width modulated signal, the selection signal being changed for every commutation timing; and
  g) drive means for driving each switching element on the basis of the energization signal, the pulse width modulated signal and the selection signal so that the negative side switching elements are controlled in accordance with on and off states of the pulse width modulated signal when commutation is caused to occur between two of the positive side switching elements and so that the positive side switching elements are controlled in accordance with the on and off states of the pulse width modulated signal when commutation is caused to occur between two of the negative side switching elements.

9. An inverter according to claim 6, 7 or 8, wherein the reference voltage with which the terminal voltage of each motor winding is compared for the detection of the energized state of each diode is set at a half of a direct current power supply voltage of the switching circuit.

10. An inverter according to claim 5, 7 or 8, wherein the energization signal generating means obtains a reference commutation timing from the information about the rotational position of the rotor and determines the commutation timing so that the commutation timing corresponds to a time a compensation period of time before the reference commutation timing, the compensation period of time being set at a half of the commutation time period.

11. An inverter according to claim 5, 7 or 8, wherein the position detecting means compares a or the terminal voltage of each motor winding with a or the reference voltage to obtain the information about the rotational position of the rotor.

12. An inverter according to claim 5, 7 or 8, wherein the position detecting means compares a or the terminal voltage of each motor winding with a or the reference voltage to obtain the information about the rotational position of the rotor and the reference voltage is set at a half of a direct current power supply voltage of the switching circuit.

13. An inverter according to claim 5, 7 or 8, wherein the position detecting means supplies the energization signal generating means with, as the information about the rotational position of the rotor, a time when a terminal voltage of the motor winding intersects a reference voltage set at a half of a direct current power supply voltage supplied to the switching circuit and the energization signal generating means comprises a first timer timing a period between the time when the winding terminal voltage intersects the reference voltage and a subsequent time of intersection, operational means for operating a period of time between the time when the winding terminal voltage intersects the reference voltage and a reference commutation timing on the basis of the time period obtained by the first timer, thereby subtracting a compensation time period from the obtained time period to obtain a post-compensation time period, the compensation time period corresponding to a half of the commutation time period, and a second timer initiating a timing operation at the time when the winding terminal voltage intersects the reference voltage, the commutation timing being determined to be a time when the second timer has completed a timing operation for the post-commutation time period.

* * * * *